US012395397B2

(12) United States Patent
Mehta et al.

(10) Patent No.: US 12,395,397 B2
(45) Date of Patent: Aug. 19, 2025

(54) REAL-TIME MONITORING ECOSYSTEM

(71) Applicant: CITIBANK, N.A., New York, NY (US)

(72) Inventors: Japan Mehta, Dallas, TX (US); Abhishek Seth, Singapore (SG); Siva Koti Reddy Malapati, Singapore (SG)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/129,306

(22) Filed: Mar. 31, 2023

(65) Prior Publication Data

US 2024/0333578 A1 Oct. 3, 2024

(51) Int. Cl.
*H04L 41/0631* (2022.01)
*G06N 3/02* (2006.01)
*H04L 41/16* (2022.01)

(52) U.S. Cl.
CPC ........ *H04L 41/0631* (2013.01); *G06N 3/02* (2013.01); *H04L 41/16* (2013.01)

(58) Field of Classification Search
CPC ....... H04L 41/0631; H04L 41/16; G06N 3/02; G06N 3/044; G06N 3/08; G06N 5/01; G06N 20/20; G06N 7/01
See application file for complete search history.

(56) References Cited

U.S. PATENT DOCUMENTS

| | | | |
|---|---|---|---|
| 11,416,754 B1* | 8/2022 | Durvasula | G06N 3/08 |
| 2012/0233328 A1 | 9/2012 | Iyoob et al. | |
| 2012/0303800 A1 | 11/2012 | Maldaner | |
| 2012/0324092 A1 | 12/2012 | Brown et al. | |
| 2019/0041835 A1* | 2/2019 | Cella | G06Q 30/02 |
| 2020/0358662 A1* | 11/2020 | Kundu | G06N 3/045 |
| 2022/0036302 A1* | 2/2022 | Cella | G06Q 10/0835 |
| 2023/0252224 A1* | 8/2023 | Tran | G06F 40/56 |
| | | | 715/256 |

OTHER PUBLICATIONS

International Search Report and Written Opinion issued in corresponding International Application No. PCT/US2024/021707 on Jun. 19, 2024 (19 pages).

* cited by examiner

*Primary Examiner* — Brian Whipple
(74) *Attorney, Agent, or Firm* — Perkins Coie LLP

(57) ABSTRACT

A network system to provide real-time integration and processing of user data with infrastructure data to generate solutions to user pain points. Real-time user data, including feedback and interactions, is generally not uniform and overwhelmingly large. The system provides solutions to user pain-points at scale, which, in some instances, may be unknown to the service provider. The system does so by contextually linking user data and categorizing it into standardized taxonomies. The infrastructure data is then analyzed against the taxonomies by the system's AI/ML network. The system then provides one or more pain point identifications and solutions. The system may also provide an interface to visualize the taxonomies, pain points, and trend analysis of the pain points.

16 Claims, 12 Drawing Sheets

CUSTOMER FEEDBACK SOURCES INTEGRATION

| S.No | Data Retrieved | System | Method | End Point / command |
|------|----------------|--------|--------|---------------------|
| 1. | Facebook and Twitter Data | Sprinklr | Rest API | https://api2.sprinklr.com/api/v1/reports/query |
| 2. | Play store Reviews | Google Play Public Website | Python Module | https://play.google.com/store/apps/details?id= |
| 3. | Play Store Reviews and Rating only Data | Google Cloud | GSUTIL | https://storage.cloud.google.com |
| 4. | Play store Version | Google Play Public Website | Python Module/Screen Scrape | https://play.google.com/store/apps/details?id= |
| 5. | App Store Reviews | Apple | RSS feed/API | https://itunes.apple.com/rss/ |
| 6. | App Store Version | Apple | RSS feed/API | https://itunes.apple.com/lookup?id= |
| 7. | Crashlytics | Google Firebase | Rest API | https://console.firebase.google.com/ |
| 8. | Internal Surveys | In App Surveys | Kafka Streaming | |
| 9. | Staff Feedback | Tell Us | Rest API | Open API |

FIG. 6

REAL-TIME MONITORING ECOSYSTEM

FIELD OF INVENTION

The technology relates generally to the field of infrastructure management, user experience, and more particularly to using artificial intelligence and machine learning processes to predict system outages before an outage impacts users.

BACKGROUND OF INVENTION

Typically, users suffer from similar pain points and must wait until a pain point is made known to an infrastructure manager by enough users or until the individual user lengthily goes through a user service process. Many methods of resolving user pain points comprise step-by-step diagnostic tests performed by the user. In many instances, the conclusion is there is an issue with the infrastructure, e.g., software applications, and the users pain point remains unresolved.

Conventional systems are not configured to identify pain points from user data and infrastructure data. Typically, conventional systems cannot access real-time infrastructure data when a user is suffering from a pain point. Conventional systems do not facilitate real-time linking of user data to infrastructure data. The systems do not provide solutions in a manner that is quick and painless for users to likely acknowledge. Conventional systems are not able to identify pain point identifications and solutions in real-time from user data and infrastructure data.

Further, conventional systems configure pain point identifications and solutions based on human assessments of a large group of user data over a long period of time. Human systems are unable to capture vast amounts of user data and infrastructure data in real-time. Unlike a machine learning system or artificial intelligence system, systems that rely on humans are unable to draw the subtle conclusions required to identify pain point identifications and solutions. Human systems are unable to create predictive models based on combined data collected from, for example, one or more social media, one or more app store, one or more surveys, one or more employee feedback, one or more voice transcripts, feedback, logs, IT infrastructure data, application crash data, application usage data, or an application performance data.

Identification of top trending pain points contextually linking feedback, interactions and infrastructure data comprises the following challenges: Sheer Volume-today some institutions may receive 50M user feedback and 3 MM user interactions per month; Processing—it is humanly impossible to process such volume of information to identify pain points; Direct Inputs—only a few users will drop a formal complaint rendering input via some institutions' phone an insufficient source; and Capturing—every user feedback is important to the institution and analyzing all inputs is critical to increasing user satisfaction.

Citation or identification of any document in this application is not an admission that such a document is available as prior art to the present invention.

BRIEF DESCRIPTION OF THE DRAWINGS

An understanding of the features and advantages of the present invention will be obtained by reference to the following detailed description that sets forth illustrative embodiments, in which the principles of the invention may be utilized, and the accompanying drawings of which:

FIG. 6—An illustration depicting User Feedback Sources Integration.

The figures herein are for illustrative purposes only and are not necessarily drawn to scale.

OVERVIEW

The embodiments disclosed herein can utilize machine learning to allow infrastructure managers to identify pain point identifications and solutions in real-time, as further defined below.

In one aspect, technologies herein provide methods to use machine learning systems to analyze a plurality of user data and infrastructure data to identify one or more pain point identifications and solutions. In example embodiments, the one or more pain point identifications and solutions comprise predicting one or more service outages. In example embodiments, a graphical user interface is used to display a visualization of the one or more pain point identifications and solutions.

The machine learning systems uses user data and infrastructure data from a vast number of sources such as one or more social media, one or more app store, one or more surveys, one or more employee feedback, one or more voice transcripts, feedback, logs, IT infrastructure data, application crash data, application usage data, and application performance data to create models that can identify one or more pain points. Because of the immense amount of data that is acquired, processed, and categorized, any number of human users would be unable to create the predictive models or perform the operations described herein.

This invention represents an advance in computer engineering that represents a substantial advancement over existing practices. The data acquired to prepare the predictive models are technical data relating to user and infrastructure data. The outputs of the machine learning systems are not obtainable by humans or by conventional methods. Identifying both users suffering from one or more pain point and infrastructure systems that are failing or may fail and combining these outputs creates a predictive system to present real-time pain point identifications and solutions is a non-conventional, technical, real-world output and benefit that is not obtainable with conventional systems. The methods and systems described herein are more consistent, accurate, and efficient than manual/human analysis, which is prone to bias and does not scale to the amount of qualitative data that is generated today.

Standard techniques related to making and using aspects of the invention may or may not be described in detail herein. Various aspects of computing systems and specific computer programs to implement the various technical features described herein are well known.

Example System Architectures

Turning now to the drawings, in which like numerals represent like (but not necessarily identical) elements throughout the figures, example embodiments are described in detail.

Figure 1:
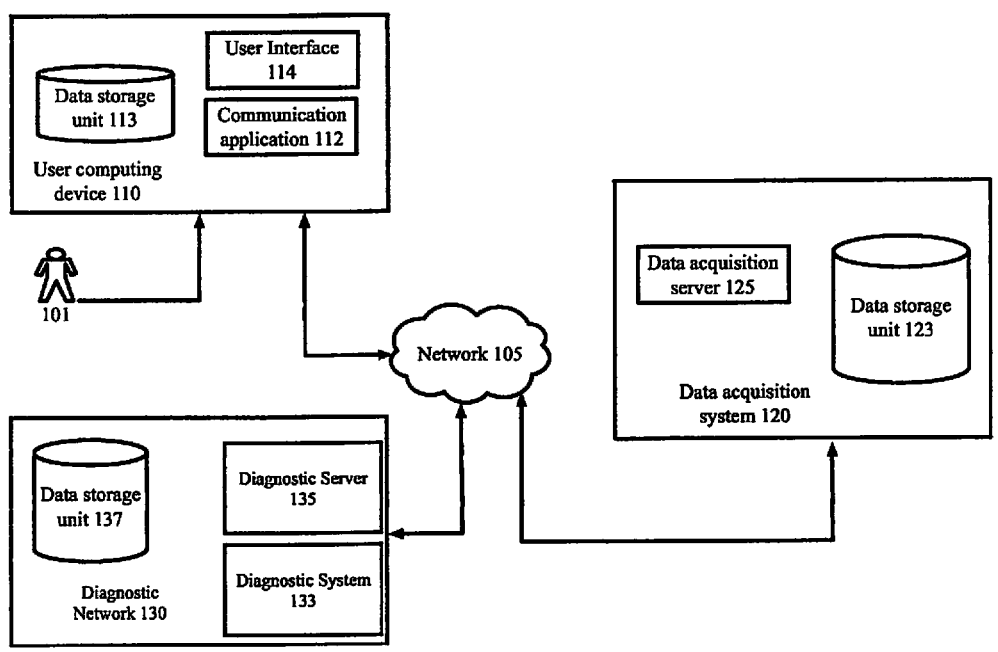
FIG. 1—A block diagram depicting a portion of a communications and processing architecture of a typical system to acquire a plurality of user data and infrastructure data from a user or database and perform machine learning resulting in one or more pain point identifications and solutions, in accordance with certain examples of the technology disclosed herein.

FIG. 1 is a block diagram depicting a system 100 to monitor computer resources from user data and infrastructure data and perform machine learning on a plurality of user data and infrastructure data. In one example embodiment, a user 101 associated with a user computing device 110 must install an application, and or make a feature selection to obtain the benefits of the techniques described herein.

As depicted in FIG. 1, the system 100 includes network computing devices/systems 110, 120, and 130 that are configured to communicate with one another via one or more networks 105 or via any suitable communication technology.

Each network 105 includes a wired or wireless telecommunication means by which network devices/systems (including devices 110, 120, and 130) can exchange data. For example, each network 105 can include any of those described herein such as the network 2080 described in FIG. 3 or any combination thereof or any other appropriate architecture or system that facilitates the communication of signals and data. Throughout the discussion of example embodiments, it should be understood that the terms "data" and "information" are used interchangeably herein to refer to text, images, audio, video, or any other form of information that can exist in a computer-based environment. The communication technology utilized by the devices/systems 110, 120, and 130 may be similar networks to network 105 or an alternative communication technology.

Each network computing device/system 110, 120, and 130 includes a computing device having a communication module capable of transmitting and receiving data over the network 105 or a similar network. For example, each network device/system 110, 120, and 130 can include any computing machine 2000 described herein and found in FIG. 3 or any other wired or wireless, processor-driven device. In the example embodiment depicted in FIG. 1, the network devices/systems 110, 120, and 130 are operated by user 101, data acquisition system operators, and diagnostic network operators, respectively.

The user computing device 110 includes a user interface 114. The user interface 114 may be used to display a graphical user interface and other information to the user 101 to allow the user 101 to interact with the data acquisition system 120, the diagnostic system 130, and others. The user interface 114 receives user input for data acquisition and/or machine learning and displays results to user 101. In another example embodiment, the user interface 114 may be provided with a graphical user interface by the data acquisition system 120 and or the diagnostic system 130. The user interface 114 may be accessed by the processor of the user computing device 110. The user interface may display 114 may display a webpage associate with the data acquisition system 120 and/or the diagnostic system 130. The user interface 114 may be used to provide input, configuration data, and other display direction by the webpage of the data acquisition system 120 and/or the diagnostic system 130. In another example embodiment, the user interface 114 may be managed by the data acquisition system 120, the diagnostic system 130, or others. In another example embodiment, the user interface 114 may be managed by the user computing device 110 and be prepared and displayed to the user 101 based on the operations of the user computing device 110.

The user 101 can use the communication application 112 on the user computing device 110, which may be, for example, a web browser application or a stand-alone application, to view, download, upload, or otherwise access documents or web pages through the user interface 114 via the network 105. The user computing device 110 can interact with the web servers or other computing devices connected to the network, including the data acquisition server 125 of the data acquisition system 120 and the diagnostic server 135 of the diagnostic system 130. In another example embodiment, the user computing device 110 communicates with devices in the data acquisition system 120 and/or the diagnostic system 130 via any other suitable technology, including the example computing system described below.

The user computing device 110 also includes a data storage unit 113 accessible by the user interface 114, the communication application 112, or other applications. The example data storage unit 113 can include one or more tangible computer-readable storage devices. The data storage unit 113 can be stored on the user computing device 110 or can be logically coupled to the user computing device 110. For example, the data storage unit 113 can include on-board flash memory and/or one or more removable memory accounts or removable flash memory. In another example embodiments, the data storage unit 113 may reside in a cloud-based computing system, for example the data storage 123 in the data acquisition system 120.

An example data acquisition system 120 comprises a data storage unit 123 and an acquisition server 125. The data storage unit 123 can include any local or remote data storage structure accessible to the data acquisition system 120 suitable for storing information. The data storage unit 123 can include one or more tangible computer-readable storage devices, or the data storage unit 123 may be a separate system, such as a different physical or virtual machine or a cloud-based storage service.

In one aspect, the data acquisition server 125 communicates with the user computing device 110 and/or the diagnostic system 130 to transmit requested data. The data may include a plurality of user data and infrastructure data or one or more pain point identifications and solutions comprises predicting one or more service outages.

An example diagnostic system 130 comprises a diagnostic system 133, a diagnostic server 135, and a data storage unit 137. The diagnostic server 135 communicates with the user computing device 110 and/or the data acquisition system 120 to request and receive data. The data may comprise the data types previously described in reference to the data acquisition server 125.

The diagnostic system 133 receives an input of data from the diagnostic server 135. The diagnostic system 133 can comprise one or more functions to implement any of the mentioned training methods to learn one or more pain point identifications and solutions from a plurality of user data and infrastructure data. In a preferred embodiment, the machine learning program may comprise a neural network. In an example embodiment, the method further comprising a pre-processing step, wherein the deployed machine learning network transforms the plurality of user data. In example embodiments, transforming the plurality of user data comprises tokenization, stemming, lemmatization, removing stop words, creating multi-grams, or any combination thereof. In example embodiments, the multi-grams comprise bi-grams or trigrams. In example embodiments, pre-processing further comprises vectorization or embedding.

The data storage unit 137 can include any local or remote data storage structure accessible to the diagnostic system 130 suitable for storing information. The data storage unit 137 can include one or more tangible computer-readable storage devices, or the data storage unit 137 may be a separate system, such as a different physical or virtual machine or a cloud-based storage service.

In an alternate embodiment, the functions of either or both of the data acquisition system 120 and the diagnostic system 130 may be performed by the user computing device 110.

It will be appreciated that the network connections shown are examples, and other means of establishing a communications link between the computers and devices can be used. Moreover, those having ordinary skill in the art having the benefit of the present disclosure will appreciate that the user computing device 110, data acquisition system 120, and the diagnostic system 130 illustrated in FIG. 1 can have any of several other suitable computer system configurations. For example, a user computing device 110 embodied as a mobile phone or handheld computer may not include all the components described above.

Figure 3:
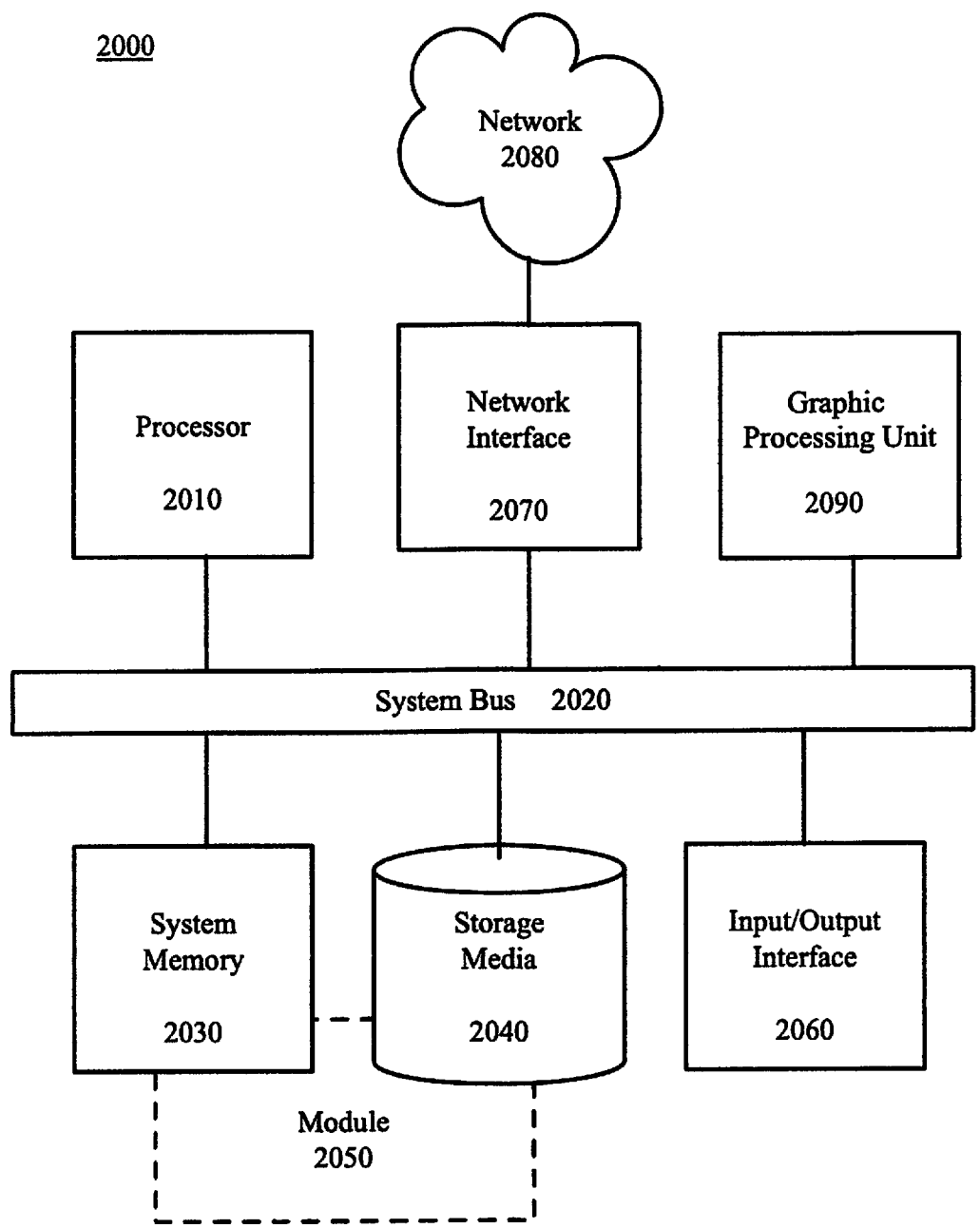
FIG. 3—A block diagram depicting a computing machine and modules, in accordance with certain examples of the technology disclosed herein.
Figure 4:
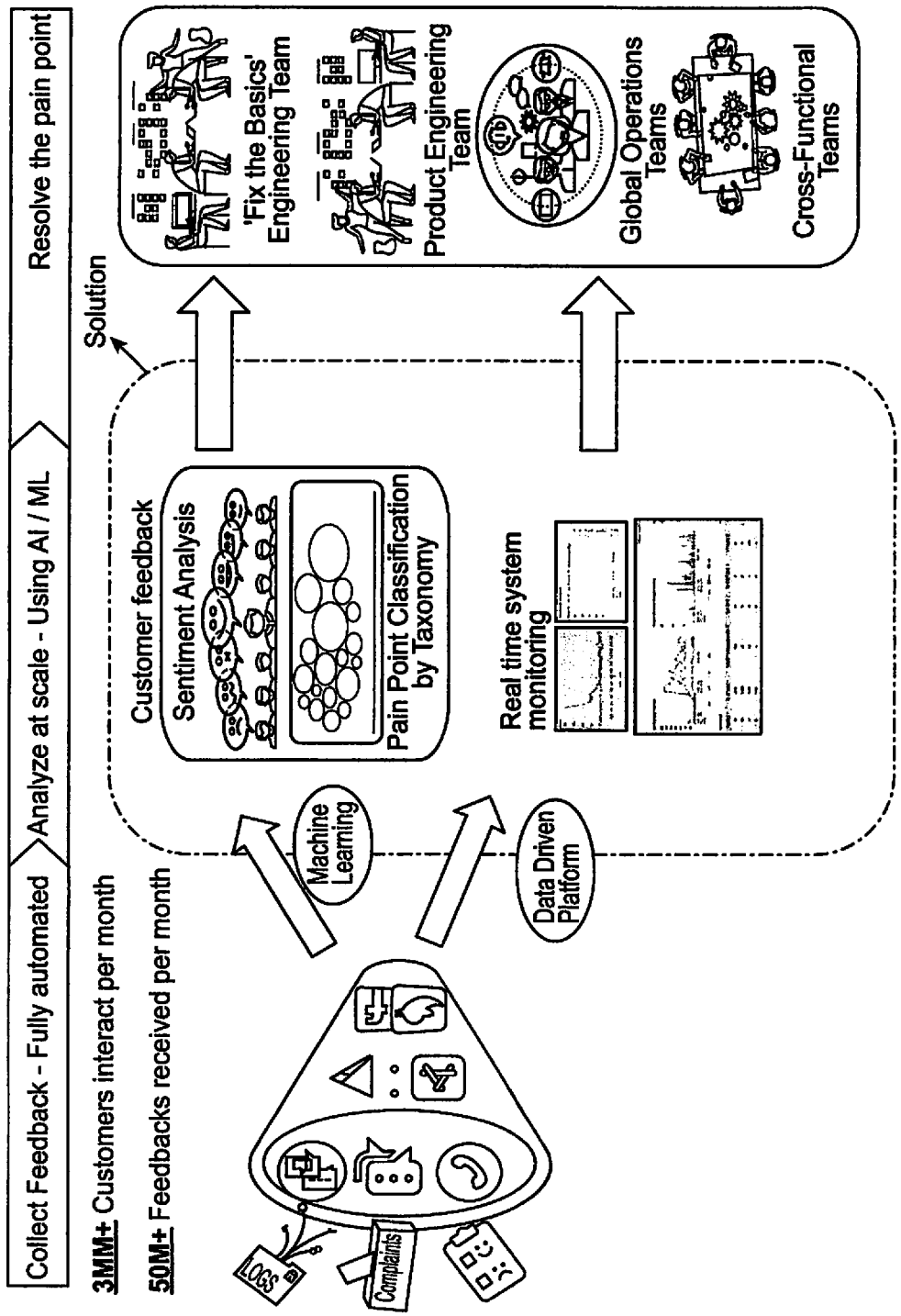
FIG. 4—An illustration depicting RTMES example process flowchart.
Figure 5:
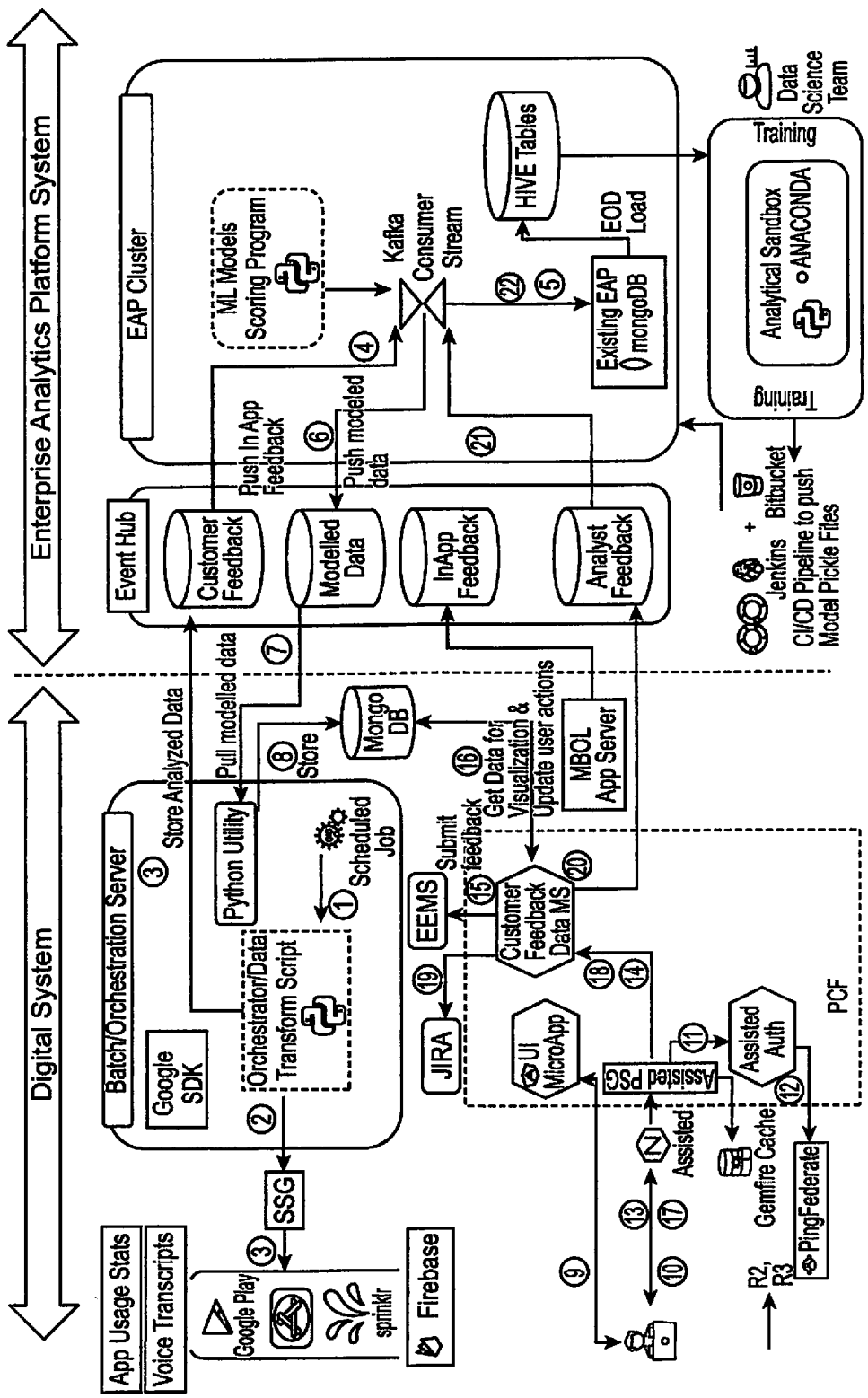
FIG. 5—An illustration depicting RTMES Logical Architecture.
Figure 7:
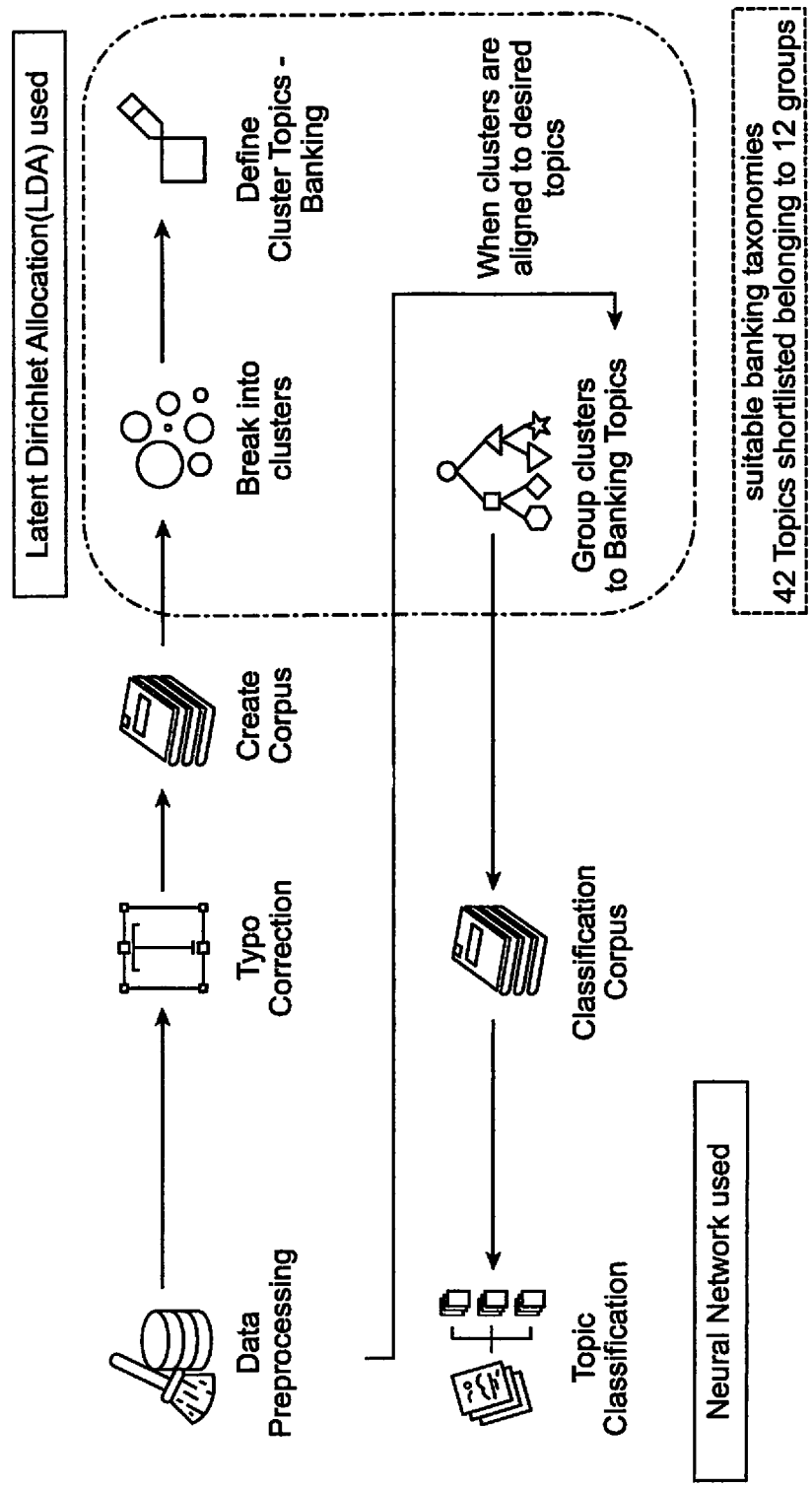
FIG. 7—An illustration depicting Topic Modelling and Classification.

In example embodiments, the network computing devices and any other computing machines associated with the technology presented herein may be any type of computing machine such as, but not limited to, those discussed in more detail with respect to FIG. 3. Furthermore, any modules associated with any of these computing machines, such as modules described herein or any other modules (scripts, web content, software, firmware, or hardware) associated with the technology presented herein may by any of the modules discussed in more detail with respect to FIG. 3. The computing machines discussed herein may communicate with one another as well as other computer machines or communication systems over one or more networks, such as network 105. The network 105 may include any type of data or communications network, including any of the network technology discussed with respect to FIG. 3.

EXAMPLE PROCESSES

Figure 2:
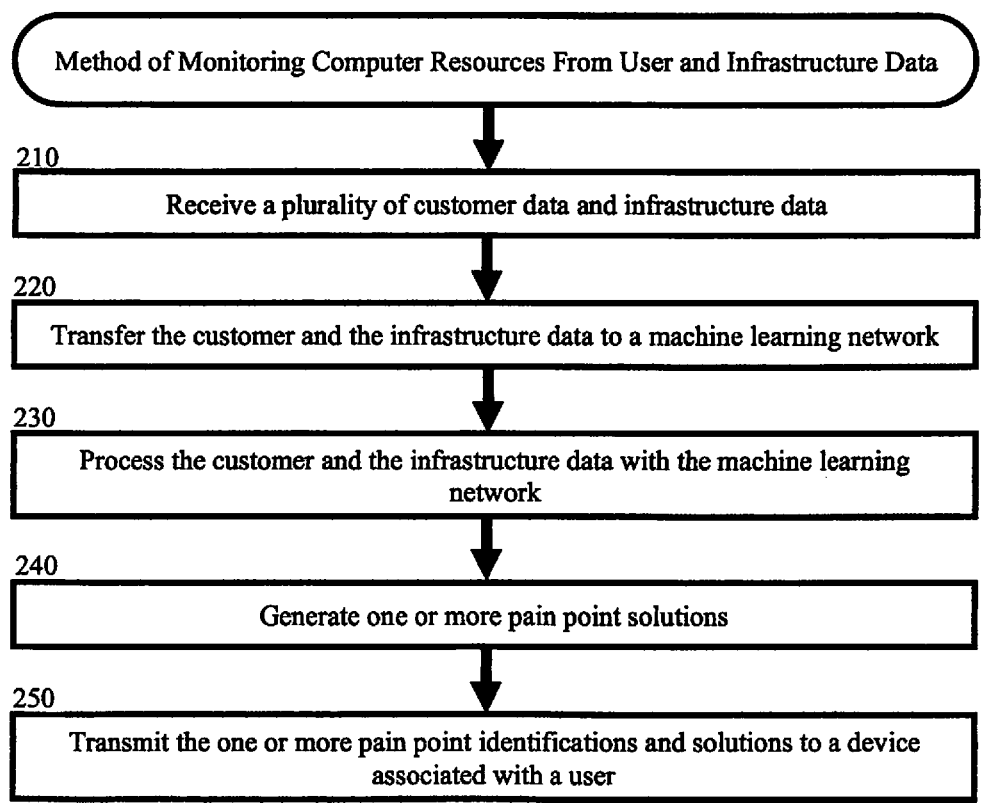
FIG. 2—A block flow diagram depicting methods to monitor computer resources from user data and infrastructure data, in accordance with certain examples of the technology disclosed herein.

The example methods illustrated in FIG. 2 is described hereinafter with respect to the components of the example architecture 100. The example methods also can be performed with other systems and in other architectures including similar elements.

Referring to FIG. 2, and continuing to refer to FIG. 1 for context, a block flow diagram illustrates methods 200 to monitor computer resources from user data and infrastructure data, in accordance with certain examples of the technology disclosed herein.

In block 210, the diagnostic system 130 and/or data acquisition system 120 receives an input of a plurality of user data and infrastructure data. The diagnostic system 130 may receive the plurality of user data and infrastructure data from the user computing device 110, the data acquisition system 120, or any other suitable source of plurality of user data and infrastructure data via the network 105 to the diagnostic system 130, discussed in more detail in other sections herein. In example embodiments, the plurality or user data and/or infrastructure data may also be separately acquired. In example embodiments, when the plurality of user data is received, the network 105 fetches, accesses, and/or receives a plurality of infrastructure data from a separate source, e.g., as described herein. The acquisition engine comprises any software or hardware individually or in combination described herein that is capable of communicating with a user device, such as fetching, receiving, or sending information, thereby allowing access to the plurality of user data and infrastructure data or one or more pain point identifications and solutions by the diagnostic system 130 or the data acquisition system 120.

User and Infrastructure Data

As described herein, user data is a component of the input used to do monitor computer resources. In general, user data is any information associated with a user, such as information that a user creates. For example, user data may comprise any information a user creates on one or more social media data, one or more app store data, one or more surveys, one or more employee feedback, one or more voice transcripts, or any combination thereof. User data may be simple, complex, or a combination thereof. Simple user data may comprise for example a like or dislike on a social media platform or a download or uninstall of an app from an app store. Complex user data may comprise, for example, trends in the user's behavior over time across sources of user data. For example, the complex data may log the amount of time a user interacts with an application and the kind of interactions the user is having with the application.

User data may comprise transaction data (such as online transaction data), web browsing data, survey data, user service data, user interactions, user feedback, web analytics, loyalty-program based data, mobile app data, wearable data, and Internet of Things (IoT) data. User data may come from one or more sources. User data may be collected from first-, second-, third-party sources, or a combination thereof. First-party sources may comprise user information directly associated with the infrastructure being monitored. Second-party sources may comprise user information associated with a partner or collaborator not directly associated with the infrastructure data being monitored. Third-party data may comprise data with relationship to the infrastructure data being monitored.

As described herein, infrastructure data is any data involved with computer resources. In general, infrastructure data is any hardware or software that supports a system accessed by a user. In particular, the infrastructure data may comprise information technology ("IT") infrastructure data. IT infrastructure data may comprise any resource, physical or virtual, that supports the system. For example, infrastructure data may comprise information on servers; storage subsystems; networking devices, like switches, routers and physical cabling; and dedicated network appliances as well as the software used by those listed. Infrastructure computing resources may include any example computing device described herein.

Infrastructure data may comprise data from immutable infrastructure, composable infrastructure, dynamic infrastructure, critical infrastructure, contact-center infrastructure, cloud infrastructure, or any combination thereof. Immutable infrastructure may comprise resources such as services or software wherein the resource, or a component thereof, is replaced when, for example, a pain point is identified. Composable infrastructure may comprise pooled resources such as physical compute, storage and network fabric resources. Dynamic infrastructure may comprise any framework that may provision and adjust itself as workload demands change. Critical infrastructure is any resource required to maintain operation, in some instances minimum operation, of a system. Contact-center infrastructure compresses of physical and virtual resources a user-contact service may need to operate such as automatic call distributors, integrated voice response units, computer-telephone integration and queue management. Cloud infrastructure may comprise any resource, such as hardware or software, that supports cloud storage services.

In example embodiments, the infrastructure data comprises real-time infrastructure data. In example embodiments, the infrastructure data comprises feedback, logs, IT infrastructure data, application crash data, application usage data, application performance data, or any combination thereof.

A service outage may comprise any an outage any of the infrastructure systems (e.g., computer resources) described herein.

In block 220, the plurality of user data and infrastructure data is transferred to the diagnostic system 133 over a network (e.g., via a transfer engine) from the data acquisition system 120 or the data storage unit 137 to the diagnostic system 133. A transfer engine comprises any software or hardware individually or in combination described herein that is capable of moving or transferring the plurality of user data and infrastructure data thereby allowing access within the diagnostic system 130.

In block 230, the diagnostic system 133 receives input of the plurality of user data and infrastructure data and passes the plurality of user data and infrastructure data to the diagnostic server 135 wherein the plurality of user data and infrastructure data is processed. In example embodiments, methods and systems described herein further comprise a pre-processing step, wherein the deployed machine learning network transforms the plurality of user data. In example embodiments, transforming the plurality of user data comprises tokenization, stemming, lemmatization, removing stop words, creating multi-grams, or any combination thereof. In example embodiments, the multi-grams comprise bi-grams or trigrams.

Transforming may comprise changing alphabetical data such that the data can be manipulated mathematically. In general, the first step comprises creating a corpus of the data. A corpus is created by categorically reducing alphabetical data. For example, by performing any one or more of tokenization, stemming, lemmatization, removing stop words, or creating multi-grams. The data in the corpus can then be converted to numerical representations using any corresponding mathematical representation.

Because the identification of the users is performed by the machine learning algorithm based on data collected by the data acquisition system 120, human analysis or cataloging is not required. The process is performed automatically by the machine learning system 130 without human intervention, as described in the machine learning section below. The amount of data typically collected includes thousands to tens of thousands of data items for each user. The total number of users may include all users accessing the system or a portion of users using a particular aspect of the system (e.g., the portion of users using the mobile application as opposed to those using a web-browser portal). Human intervention in the process is not useful or required because the amount of data is too great. A team of humans would not be able to catalog or analyze the data in any useful manner. Moreover, a human cannot access a plurality of user data and infrastructure data and from that data predict a pain point in the necessary time to avert a poor user experience.

Latent Dirichlet Allocation (LDA)

In example embodiments, processing comprises Latent Dirichlet Allocation (LDA). LDA is a topic model for classifying text, wherein a document or more generally a set of text represents a random mixture over latent topics and each topic is characterized by a distribution of words. LDA is capable of identifying similar groups of text and associating them with certain topics. Generally, topics are identified by searching for groups of text in a document and taking a probability distribution that a group of text belongs to a topic and is likely to be found in the document.

In example embodiments, LDA is used on user data to identify topics the user is suffering from. First, a number of topics are selected to be determined from the plurality of user data. The topics may comprise any topic related to the pain points described herein. The LDA model then needs to be trained to learn the selected topics. First, a set of training text is used as input for the LDA model. The text is randomly distributed among the selected topics. In an iterative process, the LDA model determines the proportion of text in a set that are currently assigned to a selected topic, then determines the proportion of assignments to the selected topic over all the sets, and reassigns the word to a different topic based off a computed probability. This process is complete once a steady state of acceptable assignments is determined. The LDA model can then be used to determine topics from user data, which can then be passed to the machine learning network. See e.g., Blei, David M., Andrew Y. Ng, and Michael I. Jordan. "Latent dirichlet allocation." *Journal of machine Learning research* 3. January (2003): 993-1022 incorporated herein by reference.

Numerical Labeling of Qualitative Data

In example embodiments, the deployed machine learning network comprises numerical labeling of qualitative metrics. Numerical labeling of qualitative metrics comprises assigning a number to non-numerical, unstructured data. User data, for example, may comprise qualitative data such as any verbatim or text-based feedback such as reviews, open-ended responses in surveys, complaints, chat messages, user interviews, case notes or social media posts. In example embodiments, topic modeling, such as LDA, is used to characterized/categorize user data. Then, the identified topics are assigned numbers. These numbers, for example, may correspond to a positive, a negative, or a combination thereof user experience.

In example embodiments, the qualitative metric is sentiment and the numerical labeling ranges across negative, neutral, and positive sentiment. Generally, a range of numbers is used which corresponds to a spectrum of positive to negative (or vice versa). In example embodiments, the range can be any numerical range, such as small to large, negative to positive, or any combination thereof and vice versa. In example embodiments, the numbers can be whole numbers, floating point numbers, or any combination thereof. In example embodiments, the range can be symmetric or asymmetric. In example embodiments, the range can be any size. For example, the range can be 5 wherein the most negative is 1, neutral is 3, and the most positive is 5. For example, the range can be 100 wherein the most negative is 50, neutral is 0, and the most positive is −50.

Therefore, in example embodiments, the methods and systems described herein comprises sentiment prediction. Sentiment prediction comprises the combination of topic modeling and numerical labeling of qualitative data to determine the sentiment of the user. In example embodiments, logistic regression is used to model sentiment prediction.

In block 240, the diagnostic system 133 processes the data of the plurality of user data and infrastructure data and generates output data comprising information containing one or more pain point identifications and/or solutions. In example embodiments, the plurality of user data and infrastructure data is processed with one or more of the machine learning methods described herein.

Pain Points

The output of the methods described herein comprise one or more pain point identifications and solutions. In general, a pain point refers to one or more problems/issues experienced by a user. In example embodiments, a pain point may comprise a persistent or recurring problem that frequently inconveniences or annoys a user. A pain point may comprise any issue that is a source of trouble, annoyance, distress, or inconvenience. Consequently, a solution to the pain point would comprise a remedying, reducing, removing, or any combination thereof the pain point. In example embodiments, the solution to a pain point is identified to a group, such as an engineering team, user care team, production support team, and/or IT teams, corresponding to the pain point. For example, a solution to a login pain point generated by the systems and methods described herein may be sent to an infrastructure manager(s) responsible for online user accounts. In another example, a pain point solution may come from combination of pain points such as a trend of abandoned sign-ins, one or more systems are taking longer for users to sign in, above average rejected sign ins, complaints about sign ins, and failed new password setups. The pain point is not just affecting systems of current users but systems of current and new users. In this scenario, the pain point solution generated by the systems and methods described herein may require repairing the infrastructure associated with a password directory. Even if a human is monitoring just log-ins, the person cannot process all the data in real-time to notice a trend affecting the infrastructure associated with a password directory. Other groups may comprise software teams, hardware teams, product teams, global operations teams, and cross-functional teams. Pain point solutions may be dependent on the infrastructure that is causing the pain point. For examples of types of infrastructure, please see the section above regarding infrastructure data.

In one example, a user may be unable to reset their password and the same failures have been noticed in infrastructure logs. Instead of system error, the failures appear valid because the user is inputting incorrect details. A solution generated by the systems and methods described herein may be to send an automated message to the customer that the information is not accurate. In another example, the systems and methods described herein recognized that users were unable to view their experiences with an application due to silent system failures. A solution generated by the systems and methods described herein may be identifying the silent system failures and alerting the IT team.

In an example embodiment, the pain point is a productivity pain point (PPP). PPPs comprise of pain points wherein the user suffers from an issue that may reduce or inhibit productivity, include redundancy, or any combination thereof. For example, a PPP may comprise a slow response or lag (e.g., pages do not load or the data is not retrieved or partially retrieved) in the system, or portion of the system, a user is utilizing. Using the methods and systems described herein, the solution to the pain point may be a targeted repair to the hardware or software of the system, or portion of the system, causing the pain point. In example embodiments, the pain point is an ineffective operating system.

In example embodiments, the pain point is a support pain point (SPP). SPPs comprise pain points wherein the user suffers from an issue of receiving the appropriate support from one or more person maintaining the system. For example, a SPP may comprise a poor or weak network connection used by support staff that inhibits, prevents, or otherwise makes difficult for a user to contact support. Using the methods and systems described herein, the solution to the pain point may be identifying the poor or weak network connection before the network connection completely fails.

In example embodiments, pain points may be located in systems that support user profiles, application stability, offering gaps, user interactions, login stability, rewards, servicing, non-application feedback dashboard, offers, application usability, or any combination thereof.

In block 250, the one or more pain point identifications and solutions is transmitted back to the user via the network 105. In example embodiments, the resulting user information is stored on the data storage unit 137. In example embodiments, the resulting user information is immediately transmitted to the user's device. In example embodiments, the resulting user information is transmitted across the network 105 to the data acquisition system for subsequent access by the user associated device 110 or diagnostic system 130.

The ladder diagrams, scenarios, flowcharts and block diagrams in the figures and discussed herein illustrate architecture, functionality, and operation of example embodiments and various aspects of systems, methods, and computer program products of the present invention. Each block in the flowchart or block diagrams can represent the processing of information and/or transmission of information corresponding to circuitry that can be configured to execute the logical functions of the present techniques. Each block in the flowchart or block diagrams can represent a module, segment, or portion of one or more executable instructions for implementing the specified operation or step. In example embodiments, the functions/acts in a block can occur out of the order shown in the figures and nothing requires that the operations be performed in the order illustrated. For example, two blocks shown in succession can executed concurrently or essentially concurrently. In another example, blocks can be executed in the reverse order. Furthermore, variations, modifications, substitutions, additions, or reduction in blocks and/or functions may be used with any of the ladder diagrams, scenarios, flow charts and block diagrams discussed herein, all of which are explicitly contemplated herein.

The ladder diagrams, scenarios, flow charts and block diagrams may be combined with one another, in part or in whole. Coordination will depend upon the required functionality. Each block of the block diagrams and/or flowchart illustration as well as combinations of blocks in the block diagrams and/or flowchart illustrations can be implemented by special purpose hardware-based systems that perform the aforementioned functions/acts or carry out combinations of special purpose hardware and computer instructions. Moreover, a block may represent one or more information transmissions and may correspond to information transmissions among software and/or hardware modules in the same physical device and/or hardware modules in different physical devices.

The present techniques can be implemented as a system, a method, a computer program product, digital electronic circuitry, and/or in computer hardware, firmware, software, or in combinations of them. The system may comprise distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as a CPU or GPU.

The computer program product can include a program tangibly embodied in an information carrier (e.g., computer readable storage medium or media) having computer readable program instructions thereon for execution by, or to control the operation of, data processing apparatus (e.g., a processor) to carry out aspects of one or more embodiments of the present invention. It will be understood that each block of the flowchart illustrations and/or block diagrams, and combinations of blocks in the flowchart illustrations and/or block diagrams, can be implemented by computer readable program instructions.

The computer readable program instructions can be performed on general purpose computing device, special purpose computing device, or other programmable data processing apparatus to produce a machine, such that the instructions, which execute via, at least partially, by one or more processors that are temporarily configured (e.g., by software) or permanently configured to perform the functions/acts specified in the flowchart and/or block diagram block or blocks. The processors, either: temporarily or permanently; or partially configured, may comprise processor-implemented modules. The present techniques referred to herein may, in example embodiments, comprise processor-implemented modules. Functions/acts of the processor-implemented modules may be distributed among the one or more processors. Moreover, the functions/acts of the pro-cessor-implements modules may be deployed across a number of machines, where the machines may be located in a single geographical location or distributed across a number of geographical locations.

The computer readable program instructions can also be stored in a computer readable storage medium that can direct one or more computer devices, programmable data processing apparatuses, and/or other devices to carry out the function/acts of the processor-implemented modules. The computer readable storage medium containing all or partial processor-implemented modules stored therein, comprises an article of manufacture including instructions which implement aspects, operations, or steps to be performed of the function/act specified in the flowchart and/or block diagram block or blocks.

Computer readable program instructions described herein can be downloaded to a computer readable storage medium within a respective computing/processing devices from a computer readable storage medium. Optionally, the computer readable program instructions can be downloaded to an external computer device or external storage device via a network. A network adapter card or network interface in each computing/processing device can receive computer readable program instructions from the network and forward the computer readable program instructions for permanent or temporary storage in a computer readable storage medium within the respective computing/processing device.

Computer readable program instructions described herein can be assembler instructions, instruction-set-architecture (ISA) instructions, machine instructions, machine dependent instructions, microcode, firmware instructions, state-setting data, or either source code or object code. The computer readable program instructions can be written in any programming language such as compiled or interpreted languages. In addition, the programming language can be object-oriented programming language (e.g. "C++") or conventional procedural programming languages (e.g. "C") or any combination thereof may be used to as computer readable program instructions. The computer readable program instructions can be distributed in any form, for example as a stand-alone program, module, subroutine, or other unit suitable for use in a computing environment. The computer readable program instructions can execute entirely on one computer or on multiple computers at one site or across multiple sites connected by a communication network, for example on user's computer, partly on the user's computer, as a stand-alone software package, partly on the user's computer and partly on a remote computer or entirely on a remote computer or server. If the computer readable program instructions are executed entirely remote, then the remote computer can be connected to the user's computer through any type of network or the connection can be made to an external computer. In examples embodiments, electronic circuitry including, but not limited to, programmable logic circuitry, field-programmable gate arrays (FPGA), or programmable logic arrays (PLA) can execute the computer readable program instructions. Electronic circuitry can utilize state information of the computer readable program instructions to personalize the electronic circuitry, to execute functions/acts of one or more embodiments of the present invention.

Example embodiments described herein include logic or a number of components, modules, or mechanisms. Modules may comprise either software modules or hardware-implemented modules. A software module may be code embodied on a non-transitory machine-readable medium or in a transmission signal. A hardware-implemented module is a tangible unit capable of performing certain operations and may be configured or arranged in a certain manner. In example embodiments, one or more computer systems (e.g., a stand-alone, client or server computer system) or one or more processors may be configured by software (e.g., an application or application portion) as a hardware-implemented module that operates to perform certain operations as described herein.

In example embodiments, a hardware-implemented module may be implemented mechanically or electronically. In example embodiments, hardware-implemented modules may comprise permanently configured dedicated circuitry or logic to execute certain functions/acts such as a special-purpose processor or logic circuitry (e.g., a field programmable gate array (FPGA) or an application-specific integrated circuit (ASIC)). In example embodiments, hardware-implemented modules may comprise temporary programmable logic or circuitry to perform certain functions/acts. For example, a general-purpose processor or other programmable processor.

The term "hardware-implemented module" encompasses a tangible entity. A tangible entity may be physically constructed, permanently configured, or temporarily or transitorily configured to operate in a certain manner and/or to perform certain functions/acts described herein. Hardware-implemented modules that are temporarily configured need not be configured or instantiated at any one time. For example, if the hardware-implemented modules comprise a general-purpose processor configured using software, then the general-purpose processor may be configured as different hardware-implemented modules at different times.

Hardware-implemented modules can provide, receive, and/or exchange information from/with other hardware-implemented modules. The hardware-implemented modules herein may be communicatively coupled. Multiple hardware-implemented modules operating concurrently, may communicate through signal transmission, for instance appropriate circuits and buses that connect the hardware-implemented modules. Multiple hardware-implemented modules configured or instantiated at different times may communicate through temporarily or permanently archived information, for instance the storage and retrieval of information in memory structures to which the multiple hardware-implemented modules have access. For example, one hardware-implemented module may perform an operation, and store the output of that operation in a memory device to which it is communicatively coupled. Consequently, another hardware-implemented module may, at some time later, access the memory device to retrieve and process the stored information. Hardware-implemented modules may also initiate communications with input or output devices, and can operate on information from the input or output devices.

In example embodiments, the present techniques can be at least partially implemented in a cloud or virtual machine environment.

Machine Learning

Machine learning is a field of study within artificial intelligence that allows computers to learn functional relationships between inputs and outputs without being explicitly programmed. Machine learning involves a module comprising algorithms that may learn from existing data by analyzing, categorizing, or identifying the data. Such machine-learning algorithms operate by first constructing a model from training data to make predictions or decisions expressed as outputs. In example embodiments, the training data includes data for one or more identified features and one or more outcomes, for example one or more pain point identifications and solutions. Although example embodiments are presented with respect to a few machine-learning algorithms, the principles presented herein may be applied to other machine-learning algorithms.

Data supplied to a machine learning algorithm can be considered a feature, which can be described as an individual measurable property of a phenomenon being observed. The concept of feature is related to that of an independent variable used in statistical techniques such as those used in linear regression. The performance of a machine learning algorithm in pattern recognition, classification and regression is highly dependent on choosing informative, discriminating, and independent features. Features may comprise numerical data, categorical data, time-series data, strings, graphs, or images. Features of the invention may further comprise a plurality of user data and infrastructure data. These data may include one or more social media data, one or more app store data, one or more surveys, one or more employee feedback, one or more voice transcripts, real-time infrastructure data, feedback, logs, IT infrastructure data, application crash data, application usage data, application performance data, or anything other user data and infrastructure data described herein.

In general, there are two categories of machine learning problems: classification problems and regression problems. Classification problems, also referred to as categorization problems, aim at classifying items into discrete category values. Training data teaches the classifying algorithm how to classify. In example embodiments, features to be categorized may include a plurality of user data and infrastructure data, which can be provided to the classifying machine learning algorithm and then placed into categories of, for example, one or more pain point identifications and solutions. Regression algorithms aim at quantifying and correlating one or more features. Training data teaches the regression algorithm how to correlate the one or more features into a quantifiable value. In example embodiments, features such as a plurality of user data and infrastructure data can be provided to the regression machine learning algorithm resulting in one or more continuous values, for example one or more pain point identifications and solutions.

The term "Artificial Intelligence" refers to a quantitative method, system, or approach ('techniques') that emulates human intelligence via computer programs. These can be used to make estimates, predictions, recommendations, or decisions in manners that go beyond classical, statistical, mathematical, econometric, or financial approaches. Machine Learning (ML) is the subset of AI that derives representations or inferences from data without explicitly programming every parameter representation or computer step (for example, Random Forest or Artificial Neural Network based algorithm approaches) to perform, for example, topic classification. In contrast, AI techniques that are not members of the ML subset include techniques such as fuzzy logic, complex dependency parsing techniques for natural language processing.

Embedding/Vectorization

In one example, the machine learning module may use embedding to provide a lower dimensional representation, such as a vector, of features to organize them based off respective similarities. In some situations, these vectors can become massive. In the case of massive vectors, particular values may become very sparse among a large number of values (e.g., a single instance of a value among 50,000 values). Because such vectors are difficult to work with, reducing the size of the vectors, in some instances, is necessary. A machine learning module can learn the embeddings along with the model parameters. In example embodiments, features such as a plurality of user data and infrastructure data can be mapped to vectors implemented in embedding methods. In example embodiments, embedded semantic meanings are utilized. Embedded semantic meanings are values of respective similarity. For example, the distance between two vectors, in vector space, may imply two values located elsewhere with the same distance are categorically similar. Embedded semantic meanings can be used with similarity analysis to rapidly return similar values. In example embodiments, a plurality of user data and infrastructure data is embedded. In example embodiments, the plurality of data is first transformed before being embedded. In example embodiments, the multi-grams comprise bi-grams or trigrams. These transformations may comprise tokenization, stemming, lemmatization, removing stop words, creating multi-grams, or any combination thereof. In example embodiments, the methods herein are developed to identify meaningful portions of the vector and extract semantic meanings between that space. Embedding and vectorization are used herein interchangeably. In example embodiments, a vector contains words or a representation of words. The vector may be reduced by removing one or more words or their representations by computing the frequency with which each word appears and removing the words that appear below a certain threshold.

Training Methods

In example embodiments, the machine learning module can be trained using techniques such as unsupervised, supervised, semi-supervised, reinforcement learning, transfer learning, incremental learning, curriculum learning techniques, and/or learning to learn. Training typically occurs after selection and development of a machine learning module and before the machine learning module is operably in use. In one aspect, the training data used to teach the machine learning module can comprise input data such as a plurality of user data and infrastructure data and the respective target output data such as one or more pain point identifications and solutions.

Unsupervised and Supervised Learning

In an example embodiment, unsupervised learning is implemented. Unsupervised learning can involve providing all or a portion of unlabeled training data to a machine learning module. The machine learning module can then determine one or more outputs implicitly based on the provided unlabeled training data. For example, unsupervised learning for topic classification may comprise training a machine learning model on unlabeled user data wherein the machine learning model learns to group and classify data based on the context of the user data. In an example embodiment, supervised learning is implemented. Supervised learning can involve providing all or a portion of labeled training data to a machine learning module, with the machine learning module determining one or more outputs based on the provided labeled training data, and the outputs are either accepted or corrected depending on the agreement to the actual outcome of the training data. In some examples, supervised learning of machine learning system(s) can be governed by a set of rules and/or a set of labels for the training input, and the set of rules and/or set of labels may be used to correct inferences of a machine learning module.

Semi-Supervised and Reinforcement Learning

In one example embodiment, semi-supervised learning is implemented. Semi-supervised learning can involve providing all or a portion of training data that is partially labeled to a machine learning module. During semi-supervised learning, supervised learning is used for a portion of labeled training data, and unsupervised learning is used for a portion of unlabeled training data. In one example embodiment, reinforcement learning is implemented. Reinforcement learning can involve first providing all or a portion of the training data to a machine learning module and as the machine learning module produces an output, the machine learning module receives a "reward" signal in response to a correct output. Typically, the reward signal is a numerical value and the machine learning module is developed to maximize the numerical value of the reward signal. In addition, reinforcement learning can adopt a value function that provides a numerical value representing an expected total of the numerical values provided by the reward signal over time.

Transfer Learning

In one example embodiment, transfer learning is implemented. Transfer learning techniques can involve providing all or a portion of a first training data to a machine learning module, then, after training on the first training data, providing all or a portion of a second training data. In example embodiments, a first machine learning module can be pre-trained on data from one or more computing devices. The first trained machine learning module is then provided to a computing device, where the computing device is intended to execute the first trained machine learning model to produce an output. Then, during the second training phase, the first trained machine learning model can be additionally trained using additional training data, where the training data can be derived from kernel and non-kernel data of one or more computing devices. This second training of the machine learning module and/or the first trained machine learning model using the training data can be performed using either supervised, unsupervised, or semi-supervised learning. In addition, it is understood transfer learning techniques can involve one, two, three, or more training attempts. Once the machine learning module has been trained on at least the training data, the training phase can be completed. The resulting trained machine learning model can be utilized as at least one of trained machine learning module.

Incremental and Curriculum Learning

In one example embodiment, incremental learning is implemented. Incremental learning techniques can involve providing a trained machine learning module with input data that is used to continuously extend the knowledge of the trained machine learning module. Another machine learning training technique is curriculum learning, which can involve training the machine learning module with training data arranged in a particular order, such as providing relatively easy training examples first, then proceeding with progressively more difficult training examples. As the name suggests, difficulty of training data is analogous to a curriculum or course of study at a school.

Learning to Learn

In one example embodiment, learning to learn is implemented. Learning to learn, or meta-learning, comprises, in general, two levels of learning: quick learning of a single task and slower learning across many tasks. For example, a machine learning module is first trained and comprises of a first set of parameters or weights. During or after operation of the first trained machine learning module, the parameters or weights are adjusted by the machine learning module. This process occurs iteratively on the success of the machine learning module. In another example, an optimizer, or another machine learning module, is used wherein the output of a first trained machine learning module is fed to an optimizer that constantly learns and returns the final results. Other techniques for training the machine learning module and/or trained machine learning module are possible as well.

Contrastive Learning

In example embodiment, contrastive learning is implemented. Contrastive learning is a self-supervised model of learning in which training data is unlabeled is considered as a form of learning in-between supervised and unsupervised learning. This method learns by contrastive loss, which separates unrelated (i.e., negative) data pairs and connects related (i.e., positive) data pairs. For example, to create positive and negative data pairs, more than one view of a datapoint, such as rotating an image or using a different time-point of a video, is used as input. Positive and negative pairs are learned by solving dictionary look-up problem. The two views are separated into query and key of a dictionary. A query has a positive match to a key and negative match to all other keys. The machine learning module then learns by connecting queries to their keys and separating queries from their non-keys. A loss function, such as those described herein, is used to minimize the distance between positive data pairs (e.g., a query to its key) while maximizing the distance between negative data points. See e.g., Tian, Yonglong, et al. "What makes for good views for contrastive learning?." Advances in Neural Information Processing Systems 33 (2020): 6827-6839.

Pre-Trained Learning

In example embodiments, the machine learning module is pre-trained. A pre-trained machine learning model is a model that has been previously trained to solve a similar problem. The pre-trained machine learning model is generally pre-trained with similar input data to that of the new problem. A pre-trained machine learning model further trained to solve a new problem is generally referred to as transfer learning, which is described herein. In some instances, a pre-trained machine learning model is trained on a large dataset of related information. The pre-trained model is then further trained and tuned for the new problem. Using a pre-trained machine learning module provides the advantage of building a new machine learning module with input neurons/nodes that are already familiar with the input data and are more readily refined to a particular problem. For example, a machine learning module previously trained using a plurality of user data and infrastructure data may be further trained to estimate one or more pain point identifications and solutions. See e.g., Diamant N, et al. Patient contrastive learning: A performant, expressive, and practical approach to electrocardiogram modeling. PLOS Comput Biol. 2022 Feb. 14; 18(2):e1009862.

In some examples, after the training phase has been completed but before producing predictions expressed as outputs, a trained machine learning module can be provided to a computing device where a trained machine learning module is not already resident, in other words, after training phase has been completed, the trained machine learning module can be downloaded to a computing device. For example, a first computing device storing a trained machine learning module can provide the trained machine learning module to a second computing device. Providing a trained machine learning module to the second computing device may comprise one or more of communicating a copy of trained machine learning module to the second computing device, making a copy of trained machine learning module for the second computing device, providing access to trained machine learning module to the second computing device, and/or otherwise providing the trained machine learning system to the second computing device. In example embodiments, a trained machine learning module can be used by the second computing device immediately after being provided by the first computing device. In some examples, after a trained machine learning module is provided to the second computing device, the trained machine learning module can be installed and/or otherwise prepared for use before the trained machine learning module can be used by the second computing device.

After a machine learning model has been trained it can be used to output, estimate, infer, predict, generate, produce, or determine, for simplicity these terms will collectively be referred to as results. A trained machine learning module can receive input data and operably generate results. As such, the input data can be used as an input to the trained machine learning module for providing corresponding results to kernel components and non-kernel components. For example, a trained machine learning module can generate results in response to requests. In example embodiments, a trained machine learning module can be executed by a portion of other software. For example, a trained machine learning module can be executed by a result daemon to be readily available to provide results upon request.

In example embodiments, a machine learning module and/or trained machine learning module can be executed and/or accelerated using one or more computer processors and/or on-device co-processors. Such on-device co-processors can speed up training of a machine learning module and/or generation of results. In some examples, trained machine learning module can be trained, reside, and execute to provide results on a particular computing device, and/or otherwise can make results for the particular computing device.

Input data can include data from a computing device executing a trained machine learning module and/or input data from one or more computing devices. In example embodiments, a trained machine learning module can use results as input feedback. A trained machine learning module can also rely on past results as inputs for generating new results. In example embodiments, input data can comprise a plurality of user data and infrastructure data and, when provided to a trained machine learning module, results in output data such as one or more pain point identifications and solutions.

Algorithms

Different machine-learning algorithms have been contemplated to carry out the embodiments discussed herein. For example, linear regression (LiR), logistic regression (LoR), Bayesian networks (for example, naive-bayes), random forest (RF) (including decision trees), neural networks (NN) (also known as artificial neural networks), matrix factorization, a hidden Markov model (HMM), support vector machines (SVM), K-means clustering (KMC), K-nearest neighbor (KNN), a suitable statistical machine learning algorithm, and/or a heuristic machine learning system for classifying or evaluating a plurality of user data and infrastructure data.

Linear Regression (LiR)

In one example embodiment, linear regression machine learning is implemented. LiR is typically used in machine learning to predict a result through the mathematical relationship between an independent and dependent variable, such as a plurality of user data and infrastructure data and one or more pain point identifications and solutions, respectively. A simple linear regression model would have one independent variable (x) and one dependent variable (y). A representation of an example mathematical relationship of a simple linear regression model would be $y=mx+b$. In this example, the machine learning algorithm tries variations of the tuning variables m and b to optimize a line that includes all the given training data.

The tuning variables can be optimized, for example, with a cost function. A cost function takes advantage of the minimization problem to identify the optimal tuning variables. The minimization problem preposes the optimal tuning variable will minimize the error between the predicted outcome and the actual outcome. An example cost function may comprise summing all the square differences between the predicted and actual output values and dividing them by the total number of input values and results in the average square error.

To select new tuning variables to reduce the cost function, the machine learning module may use, for example, gradient descent methods. An example gradient descent method comprises evaluating the partial derivative of the cost function with respect to the tuning variables. The sign and magnitude of the partial derivatives indicate whether the choice of a new tuning variable value will reduce the cost function, thereby optimizing the linear regression algorithm. A new tuning variable value is selected depending on a set threshold. Depending on the machine learning module, a steep or gradual negative slope is selected. Both the cost function and gradient descent can be used with other algorithms and modules mentioned throughout. For the sake of brevity, both the cost function and gradient descent are well known in the art and are applicable to other machine learning algorithms and may not be mentioned with the same detail.

LiR models may have many levels of complexity comprising one or more independent variables. Furthermore, in an LiR function with more than one independent variable, each independent variable may have the same one or more tuning variables or each, separately, may have their own one or more tuning variables. The number of independent variables and tuning variables will be understood to one skilled in the art for the problem being solved. In example embodiments, a plurality of user data and infrastructure data are used as the independent variables to train a LiR machine learning module, which, after training, is used to estimate, for example, one or more pain point identifications and solutions.

Logistic Regression (LoR)

In one example embodiment, logistic regression machine learning is implemented. Logistic Regression, often considered a LiR type model, is typically used in machine learning to classify information, such as a plurality of user data and infrastructure data into categories such as one or more pain point identifications and solutions. LoR takes advantage of probability to predict an outcome from input data. However, what makes LoR different from a LiR is that LoR uses a more complex logistic function, for example a sigmoid function. In addition, the cost function can be a sigmoid function limited to a result between 0 and 1. For example, the sigmoid function can be of the form $f(x)=1/(1+e^{-x})$, where x represents some linear representation of input features and tuning variables. Similar to LiR, the tuning variable(s) of the cost function are optimized (typically by taking the log of some variation of the cost function) such that the result of the cost function, given variable representations of the input features, is a number between 0 and 1, preferably falling on either side of 0.5. As described in LiR, gradient descent may also be used in LoR cost function optimization and is an example of the process. In example embodiments, a plurality of user data and infrastructure data are used as the independent variables to train a LoR machine learning module, which, after training, is used to estimate, for example, one or more pain point identifications and solutions.

Neural Networks

In one example embodiment, Neural Networks are implemented. NNs are a family of statistical learning models influenced by biological neural networks of the brain. NNs can be trained on a relatively-large dataset (e.g., 50,000 or more) and used to estimate, approximate, or predict an output that depends on a large number of inputs/features. NNs can be envisioned as so-called "neuromorphic" systems of interconnected processor elements, or "neurons", and exchange electronic signals, or "messages". Similar to the so-called "plasticity" of synaptic neurotransmitter connections that carry messages between biological neurons, the connections in NNs that carry electronic "messages" between "neurons" are provided with numeric weights that correspond to the strength or weakness of a given connection. The weights can be tuned based on experience, making NNs adaptive to inputs and capable of learning. For example, an NN for monitoring computer resources from user data and infrastructure data is defined by a set of input neurons that can be given input data such as a plurality of user data and infrastructure data. The input neuron weighs and transforms the input data and passes the result to other neurons, often referred to as "hidden" neurons. This is repeated until an output neuron is activated. The activated output neuron produces a result. In example embodiments, a plurality of user data and infrastructure data are used to train the neurons in a NN machine learning module, which, after training, is used to estimate one or more pain point identifications and solutions. In example embodiments, a NN is used for topic modeling wherein a set of text is used as input, and the NN, after training, can identify topics from the context of the set of text.

Convolutional Autoencoder

In example embodiments, convolutional autoencoder (CAE) is implemented. A CAE is a type of neural network and comprises, in general, two main components. First, the convolutional operator that filters an input signal to extract features of the signal. Second, an autoencoder that learns a set of signals from an input and reconstructs the signal into an output. By combining these two components, the CAE learns the optimal filters that minimize reconstruction error resulting an improved output. CAEs are trained to only learn filters capable of feature extraction that can be used to reconstruct the input. Generally, convolutional autoencoders implement unsupervised learning. In example embodiments, the convolutional autoencoder is a variational convolutional autoencoder. In example embodiments, features from a plurality of user data and infrastructure data are used as an input signal into a CAE which reconstructs that signal into an output such as a one or more pain point identifications and solutions.

Deep Learning

In example embodiments, deep learning is implemented. Deep learning expands the neural network by including more layers of neurons. A deep learning module is characterized as having three "macro" layers: (1) an input layer which takes in the input features, and fetches embeddings for the input, (2) one or more intermediate (or hidden) layers which introduces nonlinear neural net transformations to the inputs, and (3) a response layer which transforms the final results of the intermediate layers to the prediction. In example embodiments, a plurality of user data and infrastructure data are used to train the neurons of a deep learning module, which, after training, is used to estimate one or more pain point identifications and solutions.

Convolutional Neural Network (CNN)

In an example embodiment, a convolutional neural network is implemented. CNNs is a class of NNs further attempting to replicate the biological neural networks, but of the animal visual cortex. CNNs process data with a grid pattern to learn spatial hierarchies of features. Wherein NNs are highly connected, sometimes fully connected, CNNs are connected such that neurons corresponding to neighboring data (e.g., pixels) are connected. This significantly reduces the number of weights and calculations each neuron must perform.

In general, input data, such a plurality of user data and infrastructure data, comprises of a multidimensional vector. A CNN, typically, comprises of three layers: convolution, pooling, and fully connected. The convolution and pooling layers extract features and the fully connected layer combines the extracted features into an output, such as one or more pain point identifications and solutions.

In particular, the convolutional layer comprises of multiple mathematical operations such as of linear operations, a specialized type being a convolution. The convolutional layer calculates the scalar product between the weights and the region connected to the input volume of the neurons. These computations are performed on kernels, which are reduced dimensions of the input vector. The kernels span the entirety of the input. The rectified linear unit (i.e., ReLu) applies an elementwise activation function (e.g., sigmoid function) on the kernels.

CNNs can optimized with hyperparameters. In general, there three hyperparameters are used: depth, stride, and zero-padding. Depth controls the number of neurons within a layer. Reducing the depth may increase the speed of the CNN but may also reduce the accuracy of the CNN. Stride determines the overlap of the neurons. Zero-padding controls the border padding in the input.

The pooling layer down-samples along the spatial dimensionality of the given input (i.e., convolutional layer output), reducing the number of parameters within that activation. As an example, kernels are reduced to dimensionalities of 2×2 with a stride of 2, which scales the activation map down to 25%. The fully connected layer uses inter-layer-connected neurons (i.e., neurons are only connected to neurons in other layers) to score the activations for classification and/or regression. Extracted features may become hierarchically more complex as one layer feeds its output into the next layer. See O'Shea, K.; Nash, R. An Introduction to Convolutional Neural Networks. arXiv 2015 and Yamashita, R., et al Convolutional neural networks: an overview and application in radiology. *Insights Imaging* 9, 611-629 (2018).

Recurrent Neural Network (RNN)

In an example embodiment, a recurrent neural network is implemented. RNNs are class of NNs further attempting to replicate the biological neural networks of the brain. RNNs comprise of delay differential equations on sequential data or time series data to replicate the processes and interactions of the human brain. RNNs have "memory" wherein the RNN can take information from prior inputs to influence the current output. RNNs can process variable length sequences of inputs by using their "memory" or internal state information. Where NNs may assume inputs are independent from the outputs, the outputs of RNNs may be dependent on prior elements with the input sequence. For example, input such as a plurality of user data and infrastructure data is received by a RNN, which determines one or more pain point identifications and solutions. See Sherstinsky, Alex. "Fundamentals of recurrent neural network (RNN) and long short-term memory (LSTM) network." *Physica D: Nonlinear Phenomena* 404 (2020): 132306.

Long Short-Term Memory (LSTM)

In an example embodiment, a Long Short-term Memory is implemented. LSTM are a class of RNNs designed to overcome vanishing and exploding gradients. In RNNs, long term dependencies become more difficult to capture because the parameters or weights either do not change with training or fluctuate rapidly. This occurs when the RNN gradient exponentially decreases to zero, resulting in no change to the weights or parameters, or exponentially increases to infinity, resulting in large changes in the weights or parameters. This exponential effect is dependent on the number of layers and multiplicative gradient. LSTM overcomes the vanishing/exploding gradients by implementing "cells" within the hidden layers of the NN. The "cells" comprise three gates: an input gate, an output gate, and a forget gate. The input gate reduces error by controlling relevant inputs to update the current cell state. The output gate reduces error by controlling relevant memory content in the present hidden state. The forget gate reduces error by controlling whether prior cell states are put in "memory" or forgotten. The gates use activation functions to determine whether the data can pass through the gates. While one skilled in the art would recognize the use of any relevant activation function, example activation functions are sigmoid, tanh, and RELU.

See Zhu, Xiaodan, et al. "Long short-term memory over recursive structures." International Conference on Machine Learning. PMLR, 2015.

Bayesian Network

In one example embodiment, a Bayesian Network is implemented. BNs are used in machine learning to make predictions through Bayesian inference from probabilistic graphical models. In BNs, input features are mapped onto a directed acyclic graph forming the nodes of the graph. The edges connecting the nodes contain the conditional dependencies between nodes to form a predicative model. For each connected node the probability of the input features resulting in the connected node is learned and forms the predictive mechanism. The nodes may comprise the same, similar or different probability functions to determine movement from one node to another. The nodes of a Bayesian network are conditionally independent of its non-descendants given its parents thus satisfying a local Markov property. This property affords reduced computations in larger networks by simplifying the joint distribution.

There are multiple methods to evaluate the inference, or predictability, in a BN but only two are mentioned for demonstrative purposes. The first method involves computing the joint probability of a particular assignment of values for each variable. The joint probability can be considered the product of each conditional probability and, in some instances, comprises the logarithm of that product. The second method is Markov chain Monte Carlo (MCMC), which can be implemented when the sample size is large. MCMC is a well-known class of sample distribution algorithms and will not be discussed in detail herein.

The assumption of conditional independence of variables forms the basis for Naïve Bayes classifiers. This assumption implies there is no correlation between different input features. As a result, the number of computed probabilities is significantly reduced as well as the computation of the probability normalization. While independence between features is rarely true, this assumption exchanges reduced computations for less accurate predictions, however the predictions are reasonably accurate. In example embodiments, a plurality of user data and infrastructure data are mapped to the BN graph to train the BN machine learning module, which, after training, is used to estimate one or more pain point identifications and solutions.

Random Forest

In one example embodiment, random forest is implemented. RF consists of an ensemble of decision trees producing individual class predictions. The prevailing prediction from the ensemble of decision trees becomes the RF prediction. Decision trees are branching flowchart-like graphs comprising of the root, nodes, edges/branches, and leaves. The root is the first decision node from which feature information is assessed and from it extends the first set of edges/branches. The edges/branches contain the information of the outcome of a node and pass the information to the next node. The leaf nodes are the terminal nodes that output the prediction. Decision trees can be used for both classification as well as regression and is typically trained using supervised learning methods. Training of a decision tree is sensitive to the training data set. An individual decision tree may become over or under-fit to the training data and result in a poor predictive model. Random forest compensates by using multiple decision trees trained on different data sets. In example embodiments, a plurality of user data and infrastructure data are used to train the nodes of the decision trees of a RF machine learning module, which, after training, is used to estimate one or more pain point identifications and solutions.

Gradient Boosting

In an example embodiment, gradient boosting is implemented. Gradient boosting is a method of strengthening the evaluation capability of a decision tree node. In general, a tree is fit on a modified version of an original data set. For example, a decision tree is first trained with equal weights across its nodes. The decision tree is allowed to evaluate data to identify nodes that are less accurate. Another tree is added to the model and the weights of the corresponding underperforming nodes are then modified in the new tree to improve their accuracy. This process is performed iteratively until the accuracy of the model has reached a defined threshold or a defined limit of trees has been reached. Less accurate nodes are identified by the gradient of a loss function. Loss functions must be differentiable such as a linear or logarithmic functions. The modified node weights in the new tree are selected to minimize the gradient of the loss function. In an example embodiment, a decision tree is implemented to determine a one or more pain point identifications and solutions and gradient boosting is applied to the tree to improve its ability to accurately determine the one or more pain point identifications and solutions.

Matrix Factorization

In example embodiments, Matrix Factorization is implemented. Matrix factorization machine learning exploits inherent relationships between two entities drawn out when multiplied together. Generally, the input features are mapped to a matrix F which is multiplied with a matrix R containing the relationship between the features and a predicted outcome. The resulting dot product provides the prediction. The matrix R is constructed by assigning random values throughout the matrix. In this example, two training matrices are assembled. The first matrix X contains training input features and the second matrix Z contains the known output of the training input features. First the dot product of R and X are computed and the square mean error, as one example method, of the result is estimated. The values in R are modulated and the process is repeated in a gradient descent style approach until the error is appropriately minimized. The trained matrix R is then used in the machine learning model. In example embodiments, a plurality of user data and infrastructure data are used to train the relationship matrix R in a matrix factorization machine learning module. After training, the relationship matrix R and input matrix F, which comprises vector representations of a plurality of user data and infrastructure data, results in the prediction matrix P comprising one or more pain point identifications and solutions.

Hidden Markov Model

In example embodiments, a hidden Markov model is implemented. A HMM takes advantage of the statistical Markov model to predict an outcome. A Markov model assumes a Markov process, wherein the probability of an outcome is solely dependent on the previous event. In the case of HMM, it is assumed an unknown or "hidden" state is dependent on some observable event. A HMM comprises a network of connected nodes. Traversing the network is dependent on three model parameters: start probability; state transition probabilities; and observation probability. The start probability is a variable that governs, from the input node, the most plausible consecutive state. From there each node i has a state transition probability to node j. Typically the state transition probabilities are stored in a matrix $M_{ij}$ wherein the sum of the rows, representing the probability of state i transitioning to state j, equals 1. The observation probability is a variable containing the probability of output o occurring. These too are typically stored in a matrix $N_{oj}$ wherein the probability of output o is dependent on state j. To build the model parameters and train the HMM, the state and output probabilities are computed. This can be accomplished with, for example, an inductive algorithm. Next, the state sequences are ranked on probability, which can be accomplished, for example, with the Viterbi algorithm. Finally, the model parameters are modulated to maximize the probability of a certain sequence of observations. This is typically accomplished with an iterative process wherein the neighborhood of states is explored, the probabilities of the state sequences are measured, and model parameters updated to increase the probabilities of the state sequences. In example embodiments, a plurality of user data and infrastructure data are used to train the nodes/states of the HMM machine learning module, which, after training, is used to estimate one or more pain point identifications and solutions.

Support Vector Machine

In example embodiments, support vector machines are implemented. SVMs separate data into classes defined by n-dimensional hyperplanes (n-hyperplane) and are used in both regression and classification problems. Hyperplanes are decision boundaries developed during the training process of a SVM. The dimensionality of a hyperplane depends on the number of input features. For example, a SVM with two input features will have a linear (1-dimensional) hyperplane while a SVM with three input features will have a planer (2-dimensional) hyperplane. A hyperplane is optimized to have the largest margin or spatial distance from the nearest data point for each data type. In the case of simple linear regression and classification a linear equation is used to develop the hyperplane. However, when the features are more complex a kernel is used to describe the hyperplane. A kernel is a function that transforms the input features into higher dimensional space. Kernel functions can be linear, polynomial, a radial distribution function (or gaussian radial distribution function), or sigmoidal. In example embodiments, a plurality of user data and infrastructure data are used to train the linear equation or kernel function of the SVM machine learning module, which, after training, is used to estimate one or more pain point identifications and solutions.

K-Means Clustering

In one example embodiment, K-means clustering is implemented. KMC assumes data points have implicit shared characteristics and "clusters" data within a centroid or "mean" of the clustered data points. During training, KMC adds a number of k centroids and optimizes its position around clusters. This process is iterative, where each centroid, initially positioned at random, is re-positioned towards the average point of a cluster. This process concludes when the centroids have reached an optimal position within a cluster. Training of a KMC module is typically unsupervised. In example embodiments, a plurality of user data and infrastructure data are used to train the centroids of a KMC machine learning module, which, after training, is used to estimate one or more pain point identifications and solutions.

K-Nearest Neighbor

In one example embodiment, K-nearest neighbor is implemented. On a general level, KNN shares similar characteristics to KMC. For example, KNN assumes data points near each other share similar characteristics and computes the distance between data points to identify those similar characteristics but instead of k centroids, KNN uses k number of neighbors. The k in KNN represents how many neighbors will assign a data point to a class, for classification, or object property value, for regression. Selection of an appropriate number of k is integral to the accuracy of KNN. For example, a large k may reduce random error associated with variance in the data but increase error by ignoring small but significant differences in the data. Therefore, a careful choice of k is selected to balance overfitting and underfitting. Concluding whether some data point belongs to some class or property value k, the distance between neighbors is computed. Common methods to compute this distance are Euclidean, Manhattan or Hamming to name a few. In some embodiments, neighbors are given weights depending on the neighbor distance to scale the similarity between neighbors to reduce the error of edge neighbors of one class "outvoting" near neighbors of another class. In one example embodiment, k is 1 and a Markov model approach is utilized. In example embodiments, a plurality of user data and infrastructure data are used to train a KNN machine learning module, which, after training, is used to estimate one or more pain point identifications and solutions.

To perform one or more of its functionalities, the machine learning module may communicate with one or more other systems. For example, an integration system may integrate the machine learning module with one or more email servers, web servers, one or more databases, or other servers, systems, or repositories. In addition, one or more functionalities may require communication between a user and the machine learning module.

Any one or more of the module described herein may be implemented using hardware (e.g., one or more processors of a computer/machine) or a combination of hardware and software. For example, any module described herein may configure a hardware processor (e.g., among one or more hardware processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, to allow information to be passed between the applications so as to allow the applications to share and access common data.

Multimodal Translation

In an example embodiment, the machine learning module comprises multimodal translation (MT), also known as multimodal machine translation or multimodal neural machine translation. MT comprises of a machine learning module capable of receiving multiple (e.g. two or more) modalities. Typically, the multiple modalities comprise of information connected to each other. In example embodiments, the multiple modalities comprise a plurality of user data and infrastructure data. The machine learning module then determines one or more pain point identifications and solutions.

In example embodiments, the MT may comprise of a machine learning method further described herein. In an example embodiment, the MT comprises a neural network, deep neural network, convolutional neural network, convolutional autoencoder, recurrent neural network, or an LSTM. For example, data comprising multiple modalities from a plurality of user data and infrastructure data is embedded as further described herein. The embedded data is then received by the machine learning module. The machine learning module processes the embedded data (e.g. encoding and decoding) through the multiple layers of architecture then determines the one or more pain point identifications and solutions corresponding the modalities comprising the input. The machine learning methods further described herein may be engineered for MT wherein the inputs described herein comprise of multiple modalities of user data and infrastructure data. See e.g. Sulubacak, U., Caglayan, O., Grönroos, S A. et al. Multimodal machine translation through visuals and speech. Machine Translation 34, 97-147 (2020) and Huang, Xun, et al. "Multimodal unsupervised image-to-image translation." Proceedings of the European conference on computer vision (ECCV). 2018.

Example Computing Device

FIG. 3 depicts a block diagram of a computing machine 2000 and a module 2050 in accordance with certain examples. The computing machine 2000 may comprise, but are not limited to, remote devices, work stations, servers, computers, general purpose computers, Internet/web appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and any machine capable of executing the instructions. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The one or more processor 2010 may be configured to execute code or instructions to perform the operations and functionality described herein, manage request flow and address mappings, and to perform calculations and generate commands. Such code or instructions could include, but is not limited to, firmware, resident software, microcode, and the like. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), tensor processing units (TPUs), a graphics processing unit ("GPU"), a field programmable gate array ("FPGA"), a programmable logic device ("PLD"), a radio-frequency integrated circuit (RFIC), a controller, a state machine, gated logic, discrete hardware components, any other processing unit, or any combination or multiplicity thereof. In example embodiments, each processor 2010 can include a reduced instruction set computer (RISC) microprocessor. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines. Processors 2010 are coupled to system memory and various other components via a system bus 2020.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random-access memory ("RAM"), static random-access memory ("SRAM"), dynamic random-access memory ("DRAM"), and synchronous dynamic random-access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 is coupled to system bus 2020 and can include a basic input/output system (BIOS), which controls certain basic functions of the processor 2010 and/or operate in conjunction with, a non-volatile storage device such as the storage media 2040.

In example embodiments, the computing device 2000 includes a graphics processing unit (GPU) 2090. Graphics processing unit 2090 is a specialized electronic circuit designed to manipulate and alter memory to accelerate the creation of images in a frame buffer intended for output to a display. In general, a graphics processing unit 2090 is efficient at manipulating computer graphics and image processing and has a highly parallel structure that makes it more effective than general-purpose CPUs for algorithms where processing of large blocks of data is done in parallel.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any electromagnetic storage device, any semiconductor storage device, any physical-based storage device, any removable and non-removable media, any other data storage device, or any combination or multiplicity thereof. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The module 2050 may comprise one or more hardware or software elements, as well as an operating system, configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. Each of the operating system, one or more application programs, other program modules, and program data or some combination thereof, may include an implementation of a networking environment. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for coupling in operation the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including cursor control devices, touch-screens, scanners, electronic digitizers, sensors, receivers, touchpads, trackballs, cameras, microphones, alphanumeric input devices, any other pointing devices, or any combinations thereof. The I/O interface 2060 may couple the computing machine 2000 to various output devices including video displays (The computing device 2000 may further include a graphics display, for example, a plasma display panel (PDP), a light emitting diode (LED) display, a liquid crystal display (LCD), a projector, a cathode ray tube (CRT), or any other display capable of displaying graphics or video), audio generation device, printers, projectors, tactile feedback devices, automation control, robotic components, actuators, motors, fans, solenoids, valves, pumps, transmitters, signal emitters, lights, and so forth. The I/O interface 2060 may couple the computing device 2000 to various devices capable of input and out, such as a storage unit. The devices can be interconnected to the system bus 2020 via a user interface adapter, which can include, for example, a Super I/O chip integrating multiple device adapters into a single integrated circuit.

The computing machine 2000 may operate in a networked environment using logical connections through the network interface 2070 to one or more other systems or computing machines across the network 2080. The network 2080 may include a local area network ("LAN"), a wide area network ("WAN"), an intranet, an Internet, a mobile telephone network, storage area network ("SAN"), personal area network ("PAN"), a metropolitan area network ("MAN"), a wireless network ("WiFi;"), wireless access networks, a wireless local area network ("WLAN"), a virtual private network ("VPN"), a cellular or other mobile communication network, Bluetooth, near field communication ("NFC"), ultra-wideband, wired networks, telephone networks, optical networks, copper transmission cables, or combinations thereof or any other appropriate architecture or system that facilitates the communication of signals and data. The network 2080 may be packet switched, circuit switched, of any topology, and may use any communication protocol. The network 2080 may comprise routers, firewalls, switches, gateway computers and/or edge servers. Communication links within the network 2080 may involve various digital or analog communication media such as fiber optic cables, free-space optics, waveguides, electrical conductors, wireless links, antennas, radio-frequency communications, and so forth.

Information for facilitating reliable communications can be provided, for example, as packet/message sequencing information, encapsulation headers and/or footers, size/time information, and transmission verification information such as cyclic redundancy check (CRC) and/or parity check values. Communications can be made encoded/encrypted, or otherwise made secure, and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure and then decrypt/decode communications.

The processor 2010 may be connected to the other elements of the computing machine 2000 or the various peripherals discussed herein through the system bus 2020. The system bus 2020 represents one or more of any of several types of bus structures, including a memory bus or memory controller, a peripheral bus, an accelerated graphics port, and a processor or local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device such as a system on chip ("SOC"), system on package ("SOP"), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those ordinarily skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

A "server" may comprise a physical data processing system (for example, the computing device 2000 as shown in FIG. 3) running a server program. A physical server may or may not include a display and keyboard. A physical server may be connected, for example by a network, to other computing devices. Servers connected via a network may operate in the capacity of a server machine or a client machine in a server-client network environment, or as a peer machine in a distributed (e.g., peer-to-peer) network environment. The computing device 2000 can include clients' servers. For example, a client and server can be remote from each other and interact through a network. The relationship of client and server arises by virtue of computer programs in communication with each other, running on the respective computers.

Any two or more devices, two or more software/programs, and any two or more portions of a device or software/program, for simplicity referred to as technology, may be described herein as operably linked. Operably linked may be defined as at least one technology can mediate a function exerted upon at least one other technology such that the two or more technologies function normally. In general, operably linked refers to the ability for at least one technology to communicate with at least one other technology.

The example systems, methods, and acts described in the examples and described in the figures presented previously are illustrative, not intended to be exhaustive, and not meant to be limiting. In alternative examples, certain acts can be performed in a different order, in parallel with one another, omitted entirely, and/or combined between different examples, and/or certain additional acts can be performed, without departing from the scope and spirit of various examples. Plural instances may implement components, operations, or structures described as a single instance. Structures and functionality that may appear as separate in example embodiments may be implemented as a combined structure or component. Similarly, structures and functionality that may appear as a single component may be implemented as separate components. Accordingly, such alternative examples are included in the scope of the following claims, which are to be accorded the broadest interpretation to encompass such alternate examples. The terminology used herein was chosen to best explain the principles of the embodiments, the practical application or technical improvement over technologies found in the marketplace, or to enable others of ordinary skill in the art to understand the embodiments disclosed herein.

The following paragraphs list example embodiments of methods, systems, and products described herein.

In some embodiments ene aspect, as described herein a computer-implemented method to monitor computer resources from user data and infrastructure data, comprising:
  a. receiving, by one or more computing devices, a plurality of user data and infrastructure data;
  b. transferring, by the one or more computing devices, the plurality of user data and the infrastructure data to a deployed machine learning network;
  c. processing the plurality of user data and the infrastructure data with the deployed machine learning network, the deployed machine learning network generated and deployed from a training machine learning network;
  d. generating, by the deployed machine learning network, one or more pain point identifications and solutions; and
  e. transmitting, by the one or more computing device, the one or more pain point identifications and solutions to a device associated with a user.

The method of any of the above embodiments, further comprising a graphical user interface to display a visualization of the one or more pain point identifications and solutions and provide traceability of pain points identified.

The method of any of the above embodiments, wherein the one or more pain point identifications and solutions comprises predicting one or more service outages.

The method of any of the above embodiments of, further comprising a pre-processing step, wherein the deployed machine learning network transforms the plurality of user data.

The method of any of the above embodiments, wherein transforming the plurality of user data comprises tokenization, stemming, lemmatization, removing stop words, creating multi-grams, or any combination thereof.

The method of any of the above embodiments, wherein the multi-grams comprise bi-grams or trigrams.

The method of any of the above embodiments, wherein pre-processing further comprises vectorization or embedding.

The method of any of the above embodiments, wherein processing comprises creating taxonomies from the user input.

The method of any of the above embodiments, wherein processing comprises Latent Dirichlet Allocation (LDA).

The method of any of the above embodiments, wherein processing comprises sentiment prediction, optionally using logistic regression with count vectorizer.

The method of any of the above embodiments, wherein the machine learning network comprises a neural network, Bayesian network, random forest, matrix factorization, hidden Markov model, support vector machine, K-means clustering, K-nearest neighbor, linear classifiers, logistic classifiers, or any combination thereof.

The method of any of the above embodiments, wherein the neural network comprises deep learning, convolutional neural network, or recurrent neural network.

The method of any of the above embodiments, wherein the neural network comprises deep learning.

The method of any of the above embodiments, wherein a source of the plurality of user data is one or more social media data, one or more app store data, one or more surveys, one or more employee feedback, one or more voice transcripts, or any combination thereof.

The method of any of the above embodiments, wherein the infrastructure data comprises real-time infrastructure data.

The method of any of the above embodiments, wherein the infrastructure data comprises feedback, logs, IT infrastructure data, application crash data, application usage data, application performance data, or any combination thereof.

The method of any of the above embodiments, wherein the training machine learning network comprises unsupervised learning, supervised learning, semi-supervised learning, reinforcement learning, transfer learning, incremental learning, curriculum learning, learning to learn, contrastive learning, or any combination thereof.

The method of any of the above embodiments, wherein the training machine learning network comprises supervised learning or semi-supervised learning.

The method of any of the above embodiments, wherein the training machine learning network comprises numerical labeling of qualitative metrics.

The method of any of the above embodiments, wherein the qualitative metric is sentiment and the numerical labeling ranges across negative, neutral, and positive sentiment.

A system to monitor computer resources from user data and infrastructure data, comprising:
a storage device; and
a processor communicatively coupled to the storage device, wherein the processor executes application code instructions that are stored in the storage device to cause the system to:
a. receive, by one or more computing device, the plurality of user data and infrastructure data;
b. transfer by, the one or more computing devices, the plurality of user data and the infrastructure data to a deployed machine learning network;
c. process the plurality of user data and the infrastructure data with a deployed machine learning network, the deployed machine learning network generated and deployed from a training machine learning network;
d. generate by the deployed machine learning network, one or more pain point identifications and solutions; and
e. transmit the one or more pain point identifications and solutions to a device associated with a user.

The system of any of the above embodiments, further comprising a graphical user interface to display a visualization of the one or more pain point identifications and solutions and provide traceability of pain points identified.

The system of any of the above embodiments, wherein the one or more pain point identifications and solutions comprises predicting one or more service outages.

The system of any of the above embodiments, further comprising a pre-processing step, the pre-processing step comprises transforming the plurality of user data.

The system of any of the above embodiments, wherein transforming comprises tokenization, stemming, lemmatization, removing stop words, creating multi-grams, or any combination thereof.

The system of any of the above embodiments, wherein the multi-grams comprise bi-grams or trigrams.

The system of any of the above embodiments, wherein pre-processing further comprises vectorization or embedding.

The system of any of the above embodiments, wherein processing comprises creating taxonomies for the user input.

The system of any of the above embodiments, wherein processing comprises Latent Dirichlet Allocation (LDA).

The system of any of the above embodiments, wherein processing comprises sentiment prediction, optionally using logistic regression with count vectorizer.

The system of any of the above embodiments, wherein the machine learning network comprises a neural network, Bayesian network, random forest, matrix factorization, hidden Markov model, support vector machine, K-means clustering, K-nearest neighbor, linear classifiers, logistic classifiers, or any combination thereof.

The system of any of the above embodiments, wherein the neural network comprises deep learning, convolutional neural network, or recurrent neural network.

The system of any of the above embodiments, wherein the neural network comprises deep learning.

The system of any of the above embodiments, wherein a source of the plurality of user data is one or more social media data, one or more app store data, one or more surveys, one or more employee feedback, one or more voice transcripts, or any combination thereof.

The system of any of the above embodiments, wherein the infrastructure data comprises real-time infrastructure data.

The system of any of the above embodiments, wherein the infrastructure data comprises feedback, logs, IT infrastructure data, application crash data, application usage data, application performance data, or any combination thereof.

The system of any of the above embodiments, wherein the training machine learning network comprises unsupervised learning, supervised learning, semi-supervised learning, reinforcement learning, transfer learning, incremental learning, curriculum learning, learning to learn, contrastive learning, or any combination thereof.

The system of any of the above embodiments, wherein the training machine learning network comprises supervised learning or semi-supervised learning.

The system of any of the above embodiments, wherein the training machine learning network comprises numerical labeling of qualitative metrics.

The system of any of the above embodiments, wherein the qualitative metric is sentiment and the numerical labeling ranges across negative, neutral, and positive sentiment.

A computer program product, comprising:
a non-transitory computer-readable storage device having computer-executable program instructions embodied thereon, the computer-executable program instructions comprising:
a. computer-executable program instructions to receive, by one or more computing device, a plurality of user data and infrastructure data;
b. computer-executable program instructions to transfer, by the one or more computing devices, the plurality of user data and the infrastructure data to a deployed machine learning network;
c. computer-executable program instructions to process the plurality of user data and the infrastructure data with a deployed machine learning network, the deployed machine learning network generated and deployed from a training machine learning network;
d. computer-executable program instructions to generate by the deployed machine learning network, one or more pain point identifications and solutions; and
e. computer-executable program instructions to transmit the one or more pain point identifications and solutions to a device associated with a user.

The product of any of the above embodiments, further comprising a graphical user interface to display a visualization of the one or more pain point identifications and solutions and provide traceability of pain points identified.

The product of any of the above embodiments, wherein the one or more pain point identifications and solutions comprises predicting one or more service outages.

The product of any of the above embodiments, further comprising computer-executable program instructions to pre-process, by transforming, the plurality of user data.

The product of any of the above embodiments, wherein transforming the plurality of user data comprises tokenization, stemming, lemmatization, removing stop words, creating multi-grams, or any combination thereof.

The product of any of the above embodiments, wherein the multi-grams comprise bi-grams or trigrams.

The product of any of the above embodiments, wherein pre-processing further comprises vectorization or embedding.

The product of any of the above embodiments, wherein processing comprises creating taxonomies for the user input.

The product of any of the above embodiments, wherein processing comprises Latent Dirichlet Allocation (LDA).

The product of any of the above embodiments, wherein processing comprises sentiment prediction The product of any of the above embodiments, wherein the machine learning network comprises a neural network, Bayesian network, random forest, matrix factorization, hidden Markov model, support vector machine, K-means clustering, K-nearest neighbor, linear classifiers, logistic classifiers, or any combination thereof.

The product of any of the above embodiments, wherein the neural network comprises deep learning, convolutional neural network, or recurrent neural network.

The product of any of the above embodiments, wherein the neural network comprises deep learning.

The product of any of the above embodiments, wherein a source of the plurality of user data is one or more social media data, one or more app store data, one or more surveys, one or more employee feedback, one or more voice transcripts, or any combination thereof.

The product of any of the above embodiments, wherein the infrastructure data comprises real-time infrastructure data.

The product of any of the above embodiments, wherein the infrastructure data comprises feedback, logs, IT infrastructure data, application crash data, application usage data, application performance data, or any combination thereof.

The product of any of the above embodiments, wherein the training machine learning network comprises unsupervised learning, supervised learning, semi-supervised learning, reinforcement learning, transfer learning, incremental learning, curriculum learning, learning to learn, contrastive learning, or any combination thereof.

The product of any of the above embodiments, wherein the training machine learning network comprises supervised learning or semi-supervised learning.

The product of any of the above embodiments, wherein the training machine learning network comprises numerical labeling of qualitative metrics.

The product of any of the above embodiments, wherein the qualitative metric is sentiment and the numerical labeling ranges across negative, neutral, and positive sentiment.

EXAMPLES

Example 1—Real-Time Monitoring Ecosystem

Uniqueness of Real-Time Monitoring Ecosystem (RTMES) establishes a 0-hop pipeline from users to engineers by contextually linking together real-time feedback from multiple sources across Social Media, App/Play Store, voice transcripts, internal surveys, mobile application crash/performance data, complaints, and errors by using in house built AI/ML models. RTMES provides contextual unified insights from feedback, logs, IT infrastructure, app crashes/usage, surveys, voice transcripts to identify and predict top trending pain paints and predict potential outages in banking app-all using in house built AI models which to date does not exist elsewhere RTMES further provides a visual representation of contextual information (about everything related to user experience) to stakeholders for them to be able to determine top trending pain points. RTMES analyzes millions of user transaction in Real-Time and provide insights about different IT platforms, system across different consumer markets.

The solution provides smart-real-time integration and processing of user feedback channels using ML models to identify and display trending user pain points. State-of-the-art machine learning models and rule-based techniques are used to classify user feedback into sentiment categories and taxonomies. The in-built learning models have a predictive capability that helps to predict an outage before it impacts users. The methods and systems described herein provided a holistic view of IT systems, functions and infrastructure availability of banking IT ecosystem.

Example ML Model Steps: 1) Data pre-processing—data to be cleaned and labelled so it can be processed by an algorithm. Details are further described herein 2) Vectorization—processing of converting text data into numerical data as ML models only understand numerical data 3) Training & Testing—The model is built using the training subset and then tested on the testing subset.

Example Data pre-processing steps include tokenization, stemming, lemmatization, stop words, and bigrams/trigrams. Tokenization splits the sentences into separate words. Stemming reduces words to their root form but might not make sense, e.g.: running→run, leaves→leave. Lemmatization considers the semantic meaning and looks at vocabulary, e.g.: mice→mouse, saw→see. Stop Words include removing stop words, e.g., I, they are. Bigram/Trigram groups 2 or 3 words into a token to retain meaning. For example: I failed to login to my Account→fail login account.

Example sentiment prediction process includes ratings, algorithms, iterative processes, non-verbal, and/or slang. Ratings use the "Overall Ratings" as the labels during model training e.g., Negative: 1, 2 Neutral: 3 Positive: 4, 5. Algorithms such as logistic regression with count vectorizer algorithm are used in sentiment prediction. Processes adopted iterative process with manually validated records used for retraining. Non-verbal took into account the sentiments of emoticons and certain punctuation, e.g., :) is positive. Slang added features such as Country (difference in slang and sentiment tone), number of words in Caps.

Figure 8:
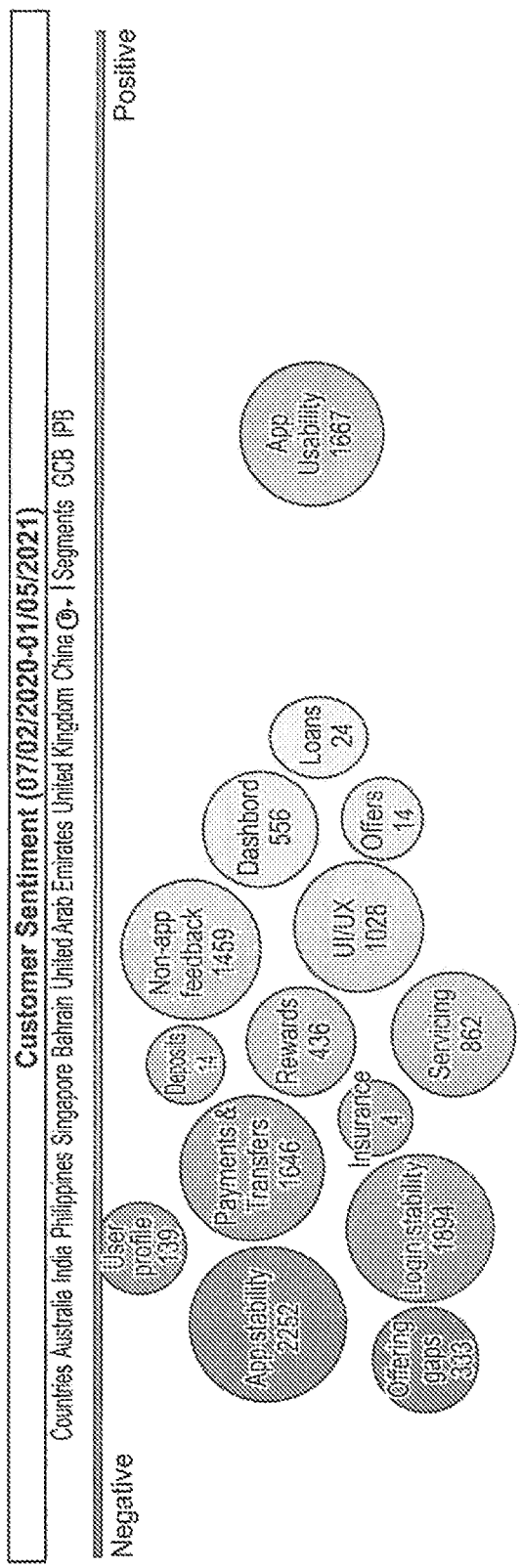
FIG. 8—An illustration depicting Feedback sentiment trends by taxonomy.
Figure 9:
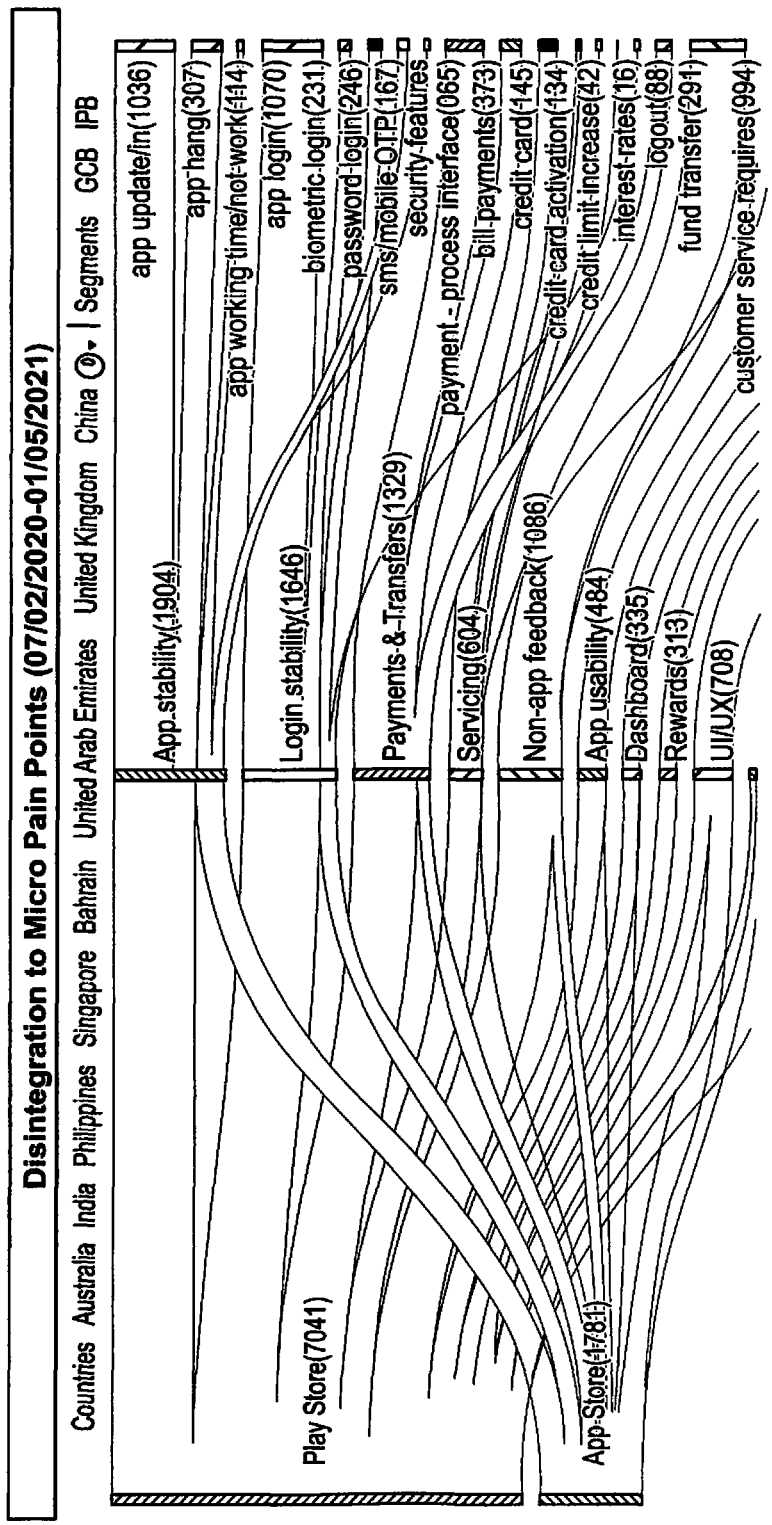
FIG. 9—An illustration depicting Disintegration of feedbacks to micro pain point.
Figure 10:
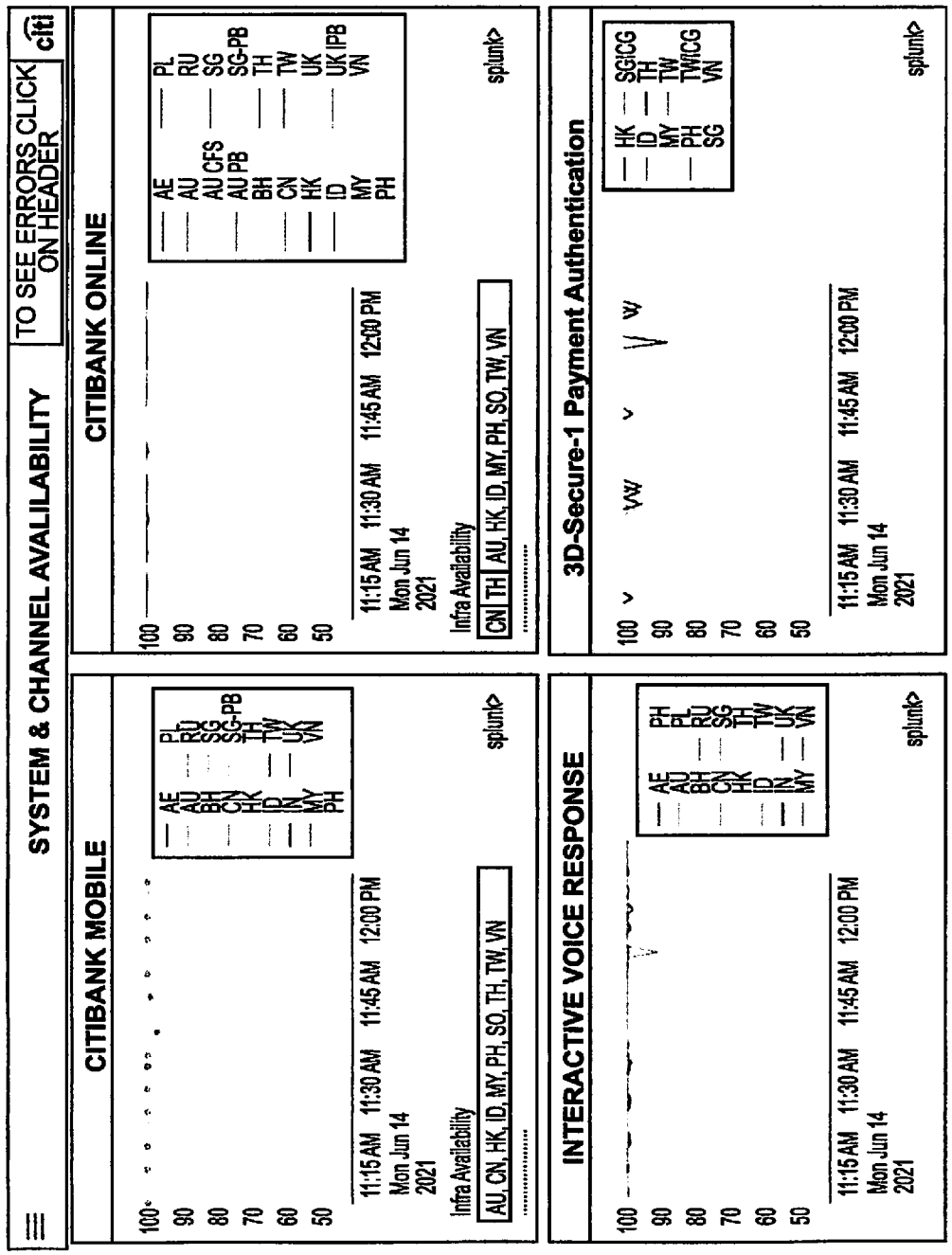
FIG. 10—An illustration depicting System & channel availability.
Figure 10:
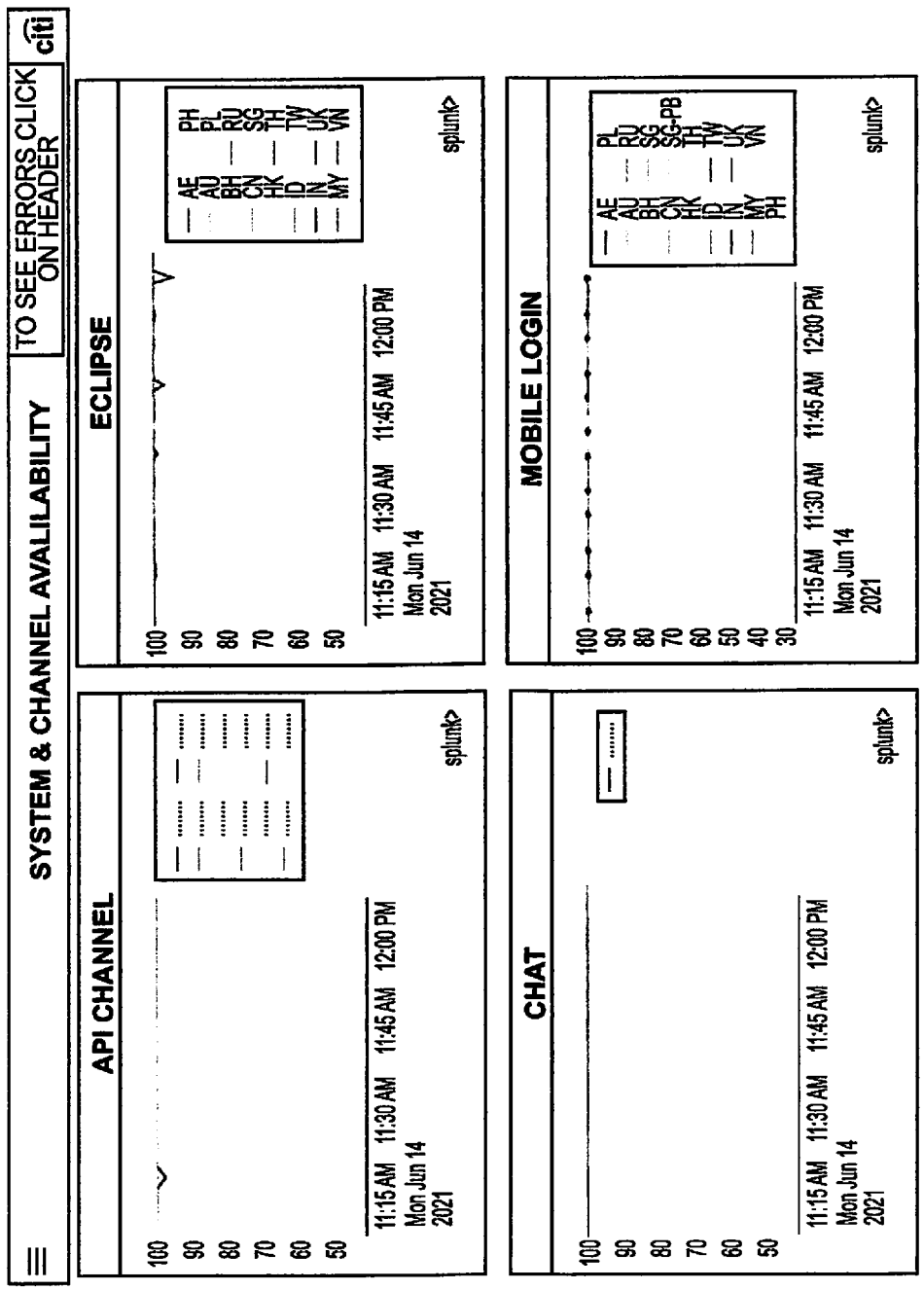
Figure 11:
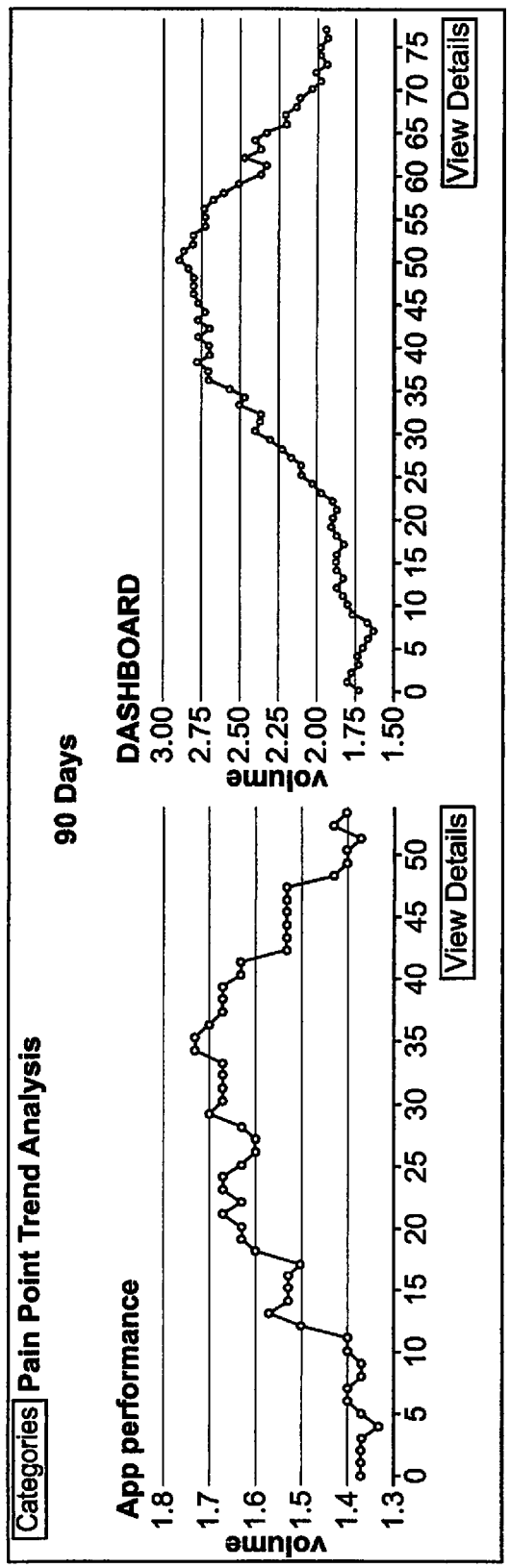
FIG. 11—An illustration depicting Trend analysis of pain points.

AI Engine Classifies user comments into standardized taxonomies, each one of it is represented in a bubble (See FIG. 8). Each bubble is plotted across a horizontal axis from Left (negative) to Right (positive). The size of bubbles indicate volume of User Feedback Received. FIG. 9 depicts how different sources of user feedback flows into business taxonomies to micro pain points. This helps understand the depth of User Pain Points at Granular level. System and channel availability dashboard (See FIG. 10) provides a view of availability for different Channels, Product processors, Partners, errors, deviation in volume for some institution channels, external interface availability. FIG. 11 depicts user pain point trends of each business taxonomies across all markets over a period of time Problem Scale & Outcome: After launching this platform, 500+ issues impacting 800k+ users/month were proactively identified and resolved during the testing and development phase. Number of hops from user complaint to fix: 1. Issues impacting 700k+ users/month resolved during the testing and development phase: 500+. User feedback records analyzed per day in Real-Time: 3k. Issues Fixed per week compared to Months/Quarter before the testing and development phase: 7. Reduction in user impact duration or down time (year over year): 46%. Fewer major incidents such as inability to make transfer or payment (year over year): 28%. User feedback records analyzed to date: 5 MM. Errors analyzed in dashboard based user interactions: 342.

RTMES provides contextual unified insight across feedbacks, logs, IT infrastructure, app crashes, surveys using in-house built AI models in identifying top trending pain points and predict potential outages. Impact of inaction may result in user experience issues, regulatory scrutiny, increase in user complaints, risk of reputation loss, and a lot more.

Various modifications and variations of the described methods, pharmaceutical compositions, and kits of the invention will be apparent to those skilled in the art without departing from the scope and spirit of the invention. Although the invention has been described in connection with specific embodiments, it will be understood that it is capable of further modifications and that the invention as claimed should not be unduly limited to such specific embodiments. Indeed, various modifications of the described modes for carrying out the invention that are obvious to those skilled in the art are intended to be within the scope of the invention. This application is intended to cover any variations, uses, or adaptations of the invention following, in general, the principles of the invention and including such departures from the present disclosure come within known customary practice within the art to which the invention pertains and may be applied to the essential features herein before set forth.

What is claimed is:

1. A computer-implemented method to monitor computer resources from real-time user data and real-time infrastructure data, comprising:
    receiving, using one or more computing devices, a plurality of real-time user data and real-time infrastructure data;
    transferring, by the one or more computing devices, the real-time user data and the real-time infrastructure data to a deployed machine learning network;
    first processing the real-time user data with the deployed machine learning network thereby transforming the plurality of real-time user data into a plurality of transformed real-time user data, wherein transforming the plurality of real-time user data comprises tokenization; stemming; lemmatization; removing stop words; creating multi-grams; or any combination thereof, and processing the plurality of transformed real-time user data and the real-time infrastructure data with the deployed machine learning network, the deployed machine learning network generated and deployed from a training machine learning network;
    inputting, into the deployed machine learning network, both the plurality of transformed real-time user data and the real-time infrastructure data to obtain a prediction of one or more recurring user problems related to a computing device, wherein the deployed machine learning network outputs the one or more recurring user problems related to the computing device; and
    transmitting, using the one or more computing devices, the one or more recurring user problems to a device associated with a user.

2. The computer-implemented method of claim 1, further comprising a graphical user interface to display a visualization of the one or more recurring user problems and provide traceability of the one or more recurring user problems.

3. The computer-implemented method of claim 1, wherein the one or more recurring user problems comprises predicting one or more service outages.

4. The computer-implemented method of claim 1, wherein the multi-grams comprise bi-grams or trigrams and/or wherein pre-processing further comprises vectorization or embedding.

5. The computer-implemented method of claim 1, wherein processing comprises Latent Dirichlet Allocation (LDA).

6. The computer-implemented method of claim 1, wherein processing comprises sentiment prediction,
    optionally using logistic regression with count vectorizer;
    optionally wherein the sentiment prediction comprises numerical labeling of qualitative metrics; and
    optionally wherein a qualitative metric is sentiment and the numerical labeling ranges across negative, neutral, and positive sentiment.

7. The computer-implemented method of claim 1, wherein the deployed machine learning network comprises a neural network, Bayesian network, random forest, matrix factorization, hidden Markov model, support vector machine, K-means clustering, K-nearest neighbor, linear classifiers, logistic classifiers, or any combination thereof,
    optionally wherein the neural network comprises convolutional neural network or recurrent neural network; and
    optionally wherein the neural network comprises deep learning.

8. The computer-implemented method of claim 1, wherein a source of the plurality of real-time user data is one or more social media data, one or more app store data, one or more surveys, one or more employee feedback, one or more voice transcripts, or any combination thereof.

9. The computer-implemented method of claim 1, wherein the real-time infrastructure data comprises feedback, logs, IT infrastructure data, application crash data, application usage data, application performance data, or any combination thereof.

10. The computer-implemented method of claim 1, wherein the real-time user data comprises of user web data, user survey data, user service data, online user interactions, user web analytics, user loyalty-program based data, user mobile app data, user wearable data, data from Internet of Things (IoT) associated with the user, or any combination thereof.

11. A system to monitor computer resources from real-time user data and real-time infrastructure data, comprising:
    a storage device; and
    a processor communicatively coupled to the storage device, wherein the processor executes application code instructions that are stored in the storage device to cause the system to:
        receive, using one or more computing devices, a plurality of real-time user data and real-time infrastructure data;
        transfer, using the one or more computing devices, the plurality of real-time user data and the real-time infrastructure data to a deployed machine learning network;
        first process the real-time user data with the deployed machine learning network thereby transforming the plurality of real-time user data, wherein transforming the plurality of real-time user data into a plurality of transformed real-time user data comprises tokenization; stemming; lemmatization; removing stop words; creating multi-grams; or any combination thereof, and then process the plurality of real-time user data and the real-time infrastructure data with the deployed machine learning network, the deployed machine learning network generated and deployed from a training machine learning network;

input, into the deployed machine learning network, both the plurality of transformed real-time user data and the real-time infrastructure data to obtain a prediction of one or more recurring user problems related to a computing device, wherein the deployed machine learning network outputs the one or more recurring user problems related to the computing device; and transmit the one or more recurring user problems to a device associated with a user.

12. The system of claim 11, wherein the one or more recurring user problems comprises predicting one or more service outages.

13. The system of claim 11, further comprising a pre-processing step, the pre-processing step comprises transforming the plurality of real-time user data;

wherein processing comprises Latent Dirichlet Allocation (LDA);

wherein the deployed machine learning network comprises a neural network, the neural network optionally comprises deep learning, convolutional neural network, or recurrent neural network.

14. A computer program product, comprising:

a non-transitory computer-readable storage device having computer-executable program instructions embodied thereon, the computer-executable program instructions causing one or more processors to:

receive, by one or more computing devices, a plurality of real-time user data and real-time infrastructure data;

transfer, by the one or more computing devices, the plurality of real-time user data and the real-time infrastructure data to a deployed machine learning network;

first process the plurality of real-time user data with the deployed machine learning network thereby transforming the plurality of real-time user data into a plurality of transformed real-time user data, wherein transforming the plurality of real-time user data comprises tokenization; stemming; lemmatization; removing stop words; creating multi-grams; or any combination thereof, and then process the plurality of real-time user data and the real-time infrastructure data with the deployed machine learning network, the deployed machine learning network generated and deployed from a training machine learning network;

input, into the deployed machine learning network, both the plurality of transformed real-time user data and the real-time infrastructure data to obtain a prediction of one or more recurring user problems related to a computing device, wherein the deployed machine learning network outputs the one or more recurring user problems related to the computing device; and transmit the one or more recurring user problems to a device associated with a user.

15. The computer program product of claim 14, wherein the one or more recurring user problems comprise predicting one or more service outages.

16. The computer program product of claim 14, wherein the computer-executable program instructions cause the one or more processors to pre-process, by transforming, the plurality of real-time user data;

wherein processing comprises Latent Dirichlet Allocation (LDA);

wherein the deployed machine learning network comprises a neural network, the neural network optionally comprises deep learning, convolutional neural network, or recurrent neural network.

* * * * *